US012794821B2

(12) United States Patent
Zhang

(10) Patent No.: US 12,794,821 B2
(45) Date of Patent: Nov. 10, 2026

(54) TRANSMISSION OF A GROUP OF DATA PACKETS BASED ON LOST DATA PACKETS IN THE GROUP OF DATA PACKET

(71) Applicant: Tencent Technology (Shenzhen) Company Limited, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 190 days.

(21) Appl. No.: 18/387,099

(22) Filed: Nov. 6, 2023

(65) Prior Publication Data

US 2024/0073737 A1 Feb. 29, 2024

Related U.S. Application Data

(63) Continuation of application No. PCT/CN2022/132210, filed on Nov. 16, 2022.

(30) Foreign Application Priority Data

Mar. 29, 2022 (CN) ......................... 202210315694.2

(51) Int. Cl.
*H04L 47/32* (2022.01)
*H04L 47/2483* (2022.01)
*H04W 28/04* (2009.01)

(52) U.S. Cl.
CPC .......... *H04L 47/32* (2013.01); *H04L 47/2483* (2013.01); *H04W 28/04* (2013.01)

(58) Field of Classification Search
CPC ............................ H04L 47/32; H04L 47/2483
See application file for complete search history.

(56) References Cited

U.S. PATENT DOCUMENTS 10,798,618 B2 * 10/2020 Kim ........................ H04W 8/02
10,986,528 B2 * 4/2021 Dao .................. H04M 15/8228
(Continued)

FOREIGN PATENT DOCUMENTS

CN 107222427 A 9/2017
CN 111586114 A 8/2020
(Continued)

OTHER PUBLICATIONS

International Search Report issued Feb. 14, 2023 in Application No. PCT/CN2022/132210, pp. 1-8.
(Continued)

*Primary Examiner* — G. C. Neurauter, Jr.
(74) *Attorney, Agent, or Firm* — ARENTFOX SCHIFF LLP

(57) ABSTRACT

In a data packet transmission method, a target data detection rule and a target processing rule for a target service flow are obtained, and a to-be-forwarded data packet is received. Based on the to-be-forwarded packet, a target data packet is determined. The target data packet belongs to a target group of the target service flow based on target data packet distinguishing information and a target group identifier that are included in the target data detection rule. Data packet loss information of the target data packet in the target group is determined. The target group is determined to be a target to-be-discarded group based on the data packet loss information in the target group and a target-group data packet loss threshold included in the target processing rule.

8 Claims, 9 Drawing Sheets

(56) References Cited

U.S. PATENT DOCUMENTS

| | | | | |
|---|---|---|---|---|
| 11,297,530 | B2 * | 4/2022 | Dao | H04M 15/8016 |
| 11,496,573 | B2 * | 11/2022 | Dao | H04W 48/04 |
| 11,678,252 | B2 * | 6/2023 | Dao | H04W 24/10 370/329 |
| 11,696,158 | B2 * | 7/2023 | Li | H04W 24/08 709/224 |
| 12,250,593 | B2 * | 3/2025 | Youn | H04W 24/10 |
| 2020/0245184 | A1 * | 7/2020 | Jin | H04L 45/74 |
| 2022/0060970 | A1 * | 2/2022 | Zhu | H04L 45/566 |
| 2022/0287136 | A1 * | 9/2022 | Wei | H04W 76/20 |
| 2022/0385589 | A1 * | 12/2022 | Qi | H04W 76/15 |
| 2023/0180038 | A1 * | 6/2023 | Chen | H04W 24/08 370/252 |
| 2023/0275698 | A1 * | 8/2023 | Pan | H04L 5/0044 |
| 2023/0354334 | A1 * | 11/2023 | Chen | H04W 72/543 |
| 2024/0031870 | A1 * | 1/2024 | Pan | H04W 4/06 |
| 2024/0073737 | A1 * | 2/2024 | Zhang | H04L 47/2483 |
| 2024/0089209 | A1 * | 3/2024 | Wang | H04L 12/14 |
| 2024/0306031 | A1 * | 9/2024 | Li | H04L 47/2475 |
| 2024/0340709 | A1 * | 10/2024 | Li | H04L 67/148 |
| 2025/0039733 | A1 * | 1/2025 | Wang | H04W 8/24 |
| 2025/0056319 | A1 * | 2/2025 | Fan | H04W 28/0268 |
| 2025/0203464 | A1 * | 6/2025 | Wang | H04L 47/2441 |
| 2025/0247746 | A1 * | 7/2025 | Zhang | H04L 41/0894 |
| 2025/0280320 | A1 * | 9/2025 | Zhu | H04W 28/0257 |

FOREIGN PATENT DOCUMENTS

| | | | | |
|---|---|---|---|---|
| CN | 113596886 | A * | 11/2021 | H04W 28/10 |
| CN | 116506697 | A * | 7/2023 | H04N 21/64792 |
| CN | 115226158 | B * | 1/2025 | H04W 16/18 |
| WO | 2021/249039 | A1 | 12/2021 | |
| WO | 2022/036870 | A1 | 2/2022 | |

OTHER PUBLICATIONS

Office Action received for European Patent Application No. 22934817.2, mailed on May 12, 2025, 6 pages.

* cited by examiner

TRANSMISSION OF A GROUP OF DATA PACKETS BASED ON LOST DATA PACKETS IN THE GROUP OF DATA PACKET

RELATED APPLICATIONS

This application is a continuation of International Application No. PCT/CN2022/132210, entitled "DATA PACKET TRANSMISSION METHOD, COMMUNICATION DEVICE, COMPUTER-READABLE STORAGE MEDIUM, AND COMPUTER PROGRAM PRODUCT" and filed on Nov. 16, 2022, which claims the benefit of priority to Chinese Patent Application No. 202210315694.2 filed on Mar. 29, 2022. The entire contents of the prior application are hereby incorporated by reference in their entirety.

FIELD OF THE TECHNOLOGY

The present disclosure relates to the field of communication technologies, including data packet transmission.

BACKGROUND OF THE DISCLOSURE

During transmission of a data packet on a network, the data packet may be lost. This is referred to as packet loss. In some cases, the lost data packet may affect an unlost data packet, for example, cause the unlost data packet to be unavailable. In this case, if the network continues to transmit the unlost data packet, network resources are wasted, and efficiency of network transmission is reduced.

SUMMARY

The following describes technical solutions in embodiments of this disclosure with reference to the accompanying drawings. The described embodiments are some of the embodiments of this disclosure rather than all of the embodiments. Other embodiments are within the scope of this disclosure.

Embodiments of the present disclosure provide a data packet transmission method, a communication equipment, a non-transitory computer-readable storage medium, and a computer program product, to detect a target to-be-discarded group in a to-be-forwarded data packet according to a target data detection rule and a target processing rule to optimize a transmission process of the data packet.

An embodiment of the present disclosure provides a data packet transmission method that may be implemented by a data processing apparatus including processing circuitry, such as a communication equipment. The method may include obtaining a target data detection rule and a target processing rule for a target service flow, and receiving a to-be-forwarded data packet. The data packet transmission method may further include determining, based on the to-be-forwarded data packet, a target data packet belonging to a target group of the target service flow based on target data packet distinguishing information and a target group identifier that are included in the target data detection rule. The data packet transmission method may further include determining data packet loss information in the target group, and determining that the target group is a target to-be-discarded group based on a target-group data packet loss threshold included in the target processing rule and the data packet loss information in the target group.

An embodiment of the present disclosure provides a data packet transmission method that may be implemented by a data processing apparatus including processing circuitry, such as a policy control function network element. The method may include obtaining group data packet processing request information of a target service flow. The group data packet processing request information may include a target group identifier, a target-group data packet loss threshold, and target data packet distinguishing information. The data packet transmission method may further include generating a group data packet processing policy rule based on the group data packet processing request information. The data packet transmission method may further include transmitting the group data packet processing policy rule to a session management function network element. The group data packet processing policy rule may be configured to generate a target data detection rule for the target service flow based on the target data packet distinguishing information and the target group identifier, and generate a target processing rule for the target service flow based on the target-group data packet loss threshold.

An embodiment of the present disclosure provides a data packet transmission method that may be implemented by a data processing apparatus including processing circuitry, such as an application function network element. The method may include: transmitting group data packet processing request information to a policy control function network element. The group data packet processing request information includes a target group identifier, a target-group data packet loss threshold, and target data packet distinguishing information. The target group identifier, the target-group data packet loss threshold, and the target data packet distinguishing information may be used for indicating to the policy control function network element to generate a group data packet processing policy rule and transmit the group data packet processing policy rule to a session management function network element.

An embodiment of the present disclosure provides a communication equipment, including: one or more processors; and a memory, configured to store one or more programs, when the one or more programs are executed by the one or more processors, the communication equipment being enabled to implement the data packet transmission method in the embodiments of the present disclosure.

An embodiment of the present disclosure provides a non-transitory computer-readable storage medium, storing a computer program, when the computer program runs on a computer, the computer being enabled to implement the data packet transmission method in the embodiments of the present disclosure.

An embodiment of the present disclosure provides a computer program product, including a computer program, the computer program, when being executed by a computer, implements the data packet transmission method in the embodiments of the present disclosure.

In the embodiments of the present disclosure, a target data detection rule and a target processing rule for a target service flow are obtained. Therefore, when a to-be-forwarded data packet is received, a target data packet belonging to a target group of the target service flow may be determined from the to-be-forwarded data packet based on target data packet distinguishing information and a target group identifier that are included in the target data detection rule. Then whether the to-be-forwarded data packet belongs to a target to-be-discarded group may be determined based on a target-group data packet loss threshold included in the target processing rule and data packet loss information in the target group. When it is determined that the to-be-forwarded data packet belongs to the target to-be-discarded group, the to-be-forwarded data packet belonging to the target to-be-discarded group may not be further transmitted during network transmission. This optimizes a network transmission process, and reduces data transmission load of a network.

DESCRIPTION OF EMBODIMENTS

Figure 1:
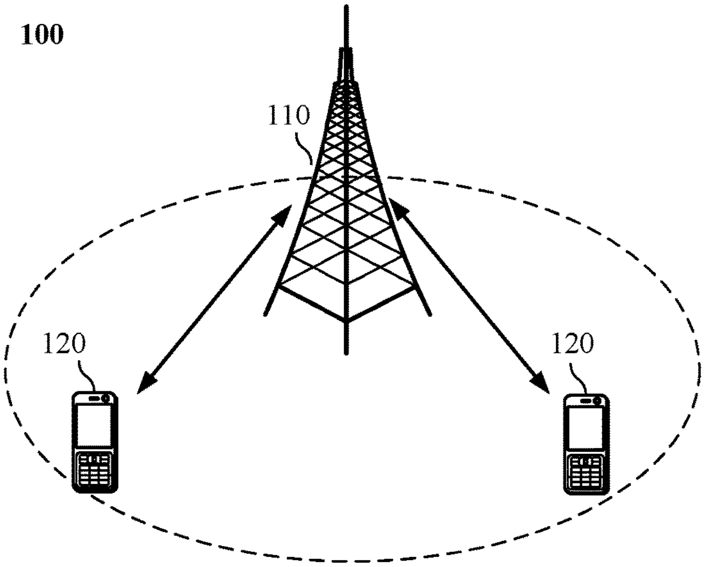
FIG. 1 is a schematic architectural diagram of a communication system according to an embodiment of the present disclosure.

To make the objectives, technical solutions, and advantages of the present disclosure clearer, the following describes exemplary embodiments of the present disclosure in detail with reference to the accompanying drawings. In the accompanying drawings, the same reference numerals represent the same elements. The embodiments described herein are merely exemplary and are not to be construed as a limitation on the scope of the present disclosure.

The technical solutions in the embodiments of the present disclosure may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G system, or a future evolved mobile communication system.

For example, a communication system 100 to which the embodiments of the present disclosure are applied is shown in FIG. 1. The communication system 100 may include a network device 110. The network device 110 may be a device that communicates with a terminal 120 (or referred to as a communication terminal or a terminal). The network device 110 may provide communication coverage for a specific geographic area, and may communicate with a terminal located within the coverage area. In some embodiments, the network device 110 may be a base transceiver station (BTS) in a GSM system or a CDMA system, or may be a NodeB (NB) in a WCDMA system, or may be an evolved NodeB (eNB or eNodeB) in an LTE system, or may be a base station in a 5G communication system or a wireless controller in a cloud radio access network (CRAN). In one embodiment, the network device may be a mobile switching center, a relay station, an access point, a vehicle-mounted device, a wearable device, a hub, a switch, a bridge, a router, a network-side device in a 5G network, a network device in a future evolved public land mobile network (PLMN), or the like.

The communication system 100 further includes at least one terminal 120 located within the coverage area of the network device 110. The "terminal" used herein includes but is not limited to: being connected through a wired line, for example, being connected through a public switched telephone network (PSTN), a digital subscriber line (DLS), a digital cable, a direct cable; and/or being connected through another data connection/network; and/or being connected through a wireless interface, for example, a cellular network, a wireless local area network (WLAN), a digital television network such as a DVB-H network, a satellite network, or an AM-FM broadcast transmitter; and/or being connected through an apparatus, configured to receive/transmit a communication signal, of another terminal; and/or being connected through an Internet of Things (IoT) device. A terminal configured to perform communication through a wireless interface may be referred to as a "wireless communication terminal", a "wireless terminal", or a "mobile terminal". Examples of the mobile terminal include but are not limited to a satellite or cellular phone, a personal communications system (PCS) terminal that may combine a cellular radio phone with data processing, fax, and data communication capabilities, a PDA that may include a radio phone, a pager, Internet/intranet access, a web browser, a notepad, a calendar, and/or a global positioning system (GPS) receiver, and a conventional laptop and/or palmtop receiver or other electronic apparatuses including a radio phone transceiver. The terminal may be an access terminal, user equipment (UE), a subscriber unit, a subscriber station, a mobile station, a mobile console, a remote station, a remote terminal, a mobile device, a user terminal, a terminal, a wireless communication equipment, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a 5G network, a terminal in a future evolved PLMN, or the like.

In some embodiments, device-to-device (D2D) communication may be performed between terminals 120.

FIG. 1 shows one network device and two terminals as an example. In some embodiments, the communication system 100 may include a plurality of network devices, and a coverage area of each network device may include another quantity of terminals. This is not limited in the embodiments of the present disclosure.

In some embodiments, the communication system 100 may further include other network elements such as a policy control function network element and an access and mobility management function network element. This is not limited in the embodiments of the present disclosure.

It is to be understood that a device with a communication capability in a network/system in the embodiments of the present disclosure may be referred to as a communication equipment. The communication system 100 shown in FIG. 1 is used as an example. The communication equipment may include the network device 110 and the terminal 120 that have a communication function. The network device 110 and the terminal 120 may be exemplary devices described above. Details are not described again herein.

It is to be understood that the terms "system" and "network" in this specification are usually used interchangeably in this specification. The term "and/or" in this specification describes only an association relationship between associated objects and indicates that three relationships may exist. For example, A and/or B may indicate the following three cases: Only A exists, both A and B exist, and only B exists.

Figure 2:
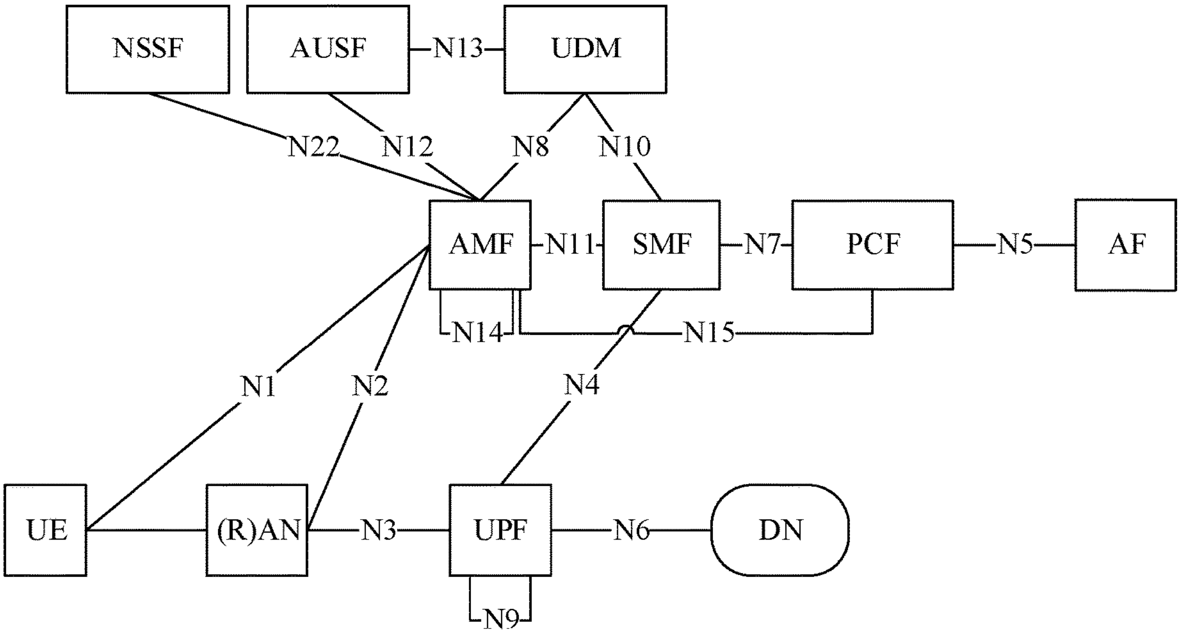
FIG. 2 is a diagram of a system architecture of a 5G network according to an embodiment of the present disclosure.

FIG. 2 is a diagram of a system architecture of a 5G network according to an embodiment of the present disclosure. As shown in FIG. 2, devices in the 5G network system include UE, a radio access network (RAN), a user plane function (UPF) network element, a data network (DN), an access and mobility management function (AMF) network element, a session management function (SMF) network element, a policy control function (PCF) network element, an application function (AF) network element, an authentication server function (AUSF) network element, a unified data management (UDM) network element, and a network slice selection function (NSSF).

Figure 3:
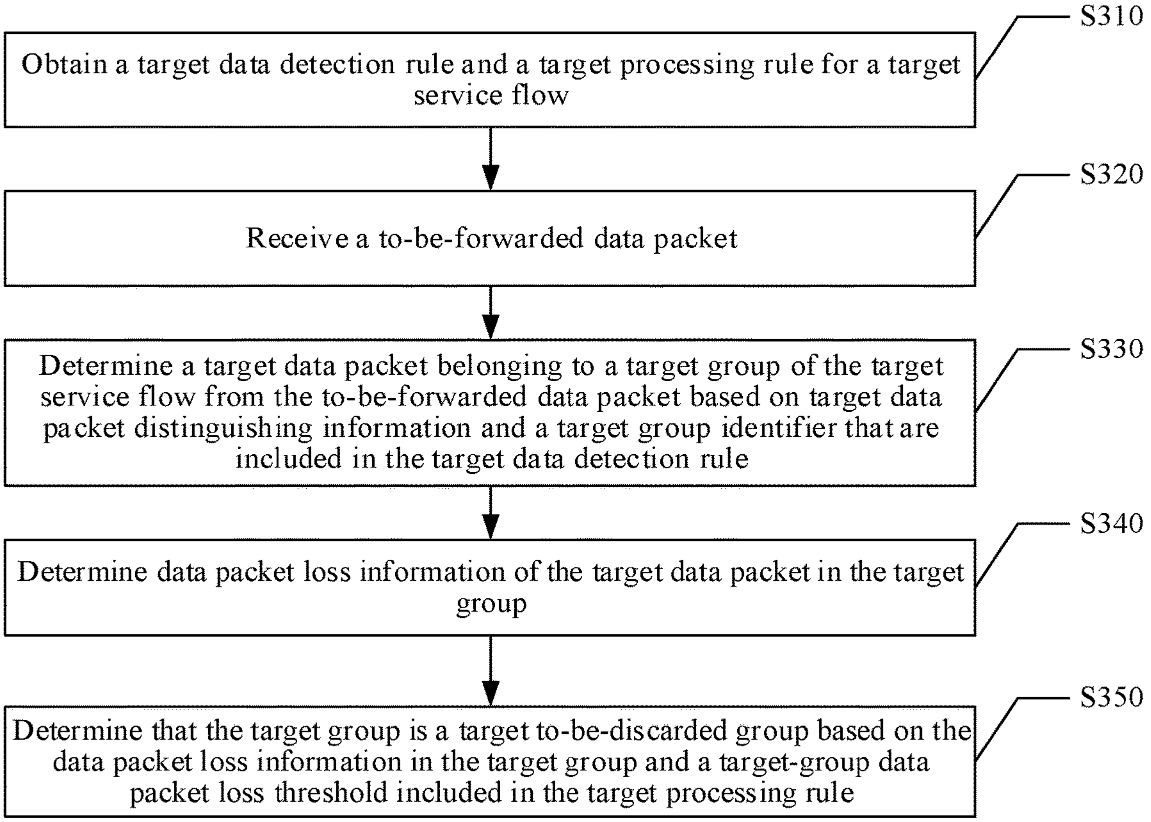
FIG. 3 is a flowchart of a data packet transmission method according to an embodiment of the present disclosure.

FIG. 3 is a flowchart of a data packet transmission method according to an embodiment of the present disclosure. The method provided in FIG. 3 may be performed by various communication equipment, for example, by a UPF network element and/or a network device (for example, a base station). The network device in this embodiment of the present disclosure may be, for example, the network device 110 in FIG. 1, but this embodiment of the present disclosure is not limited thereto. Any communication equipment that needs to detect and process a data packet may use the method provided in this embodiment of the present disclosure.

As shown in FIG. 3, the method provided in this embodiment of the present disclosure may include S310 to S350. Details are described below.

In S310, a target data detection rule and a target processing rule for a target service flow are obtained.

In this embodiment of the present disclosure, the UPF network element or the network device may obtain the target data detection rule and the target processing rule for the target service flow, or both the UPF network element and the network device may obtain the target data detection rule and the target processing rule for the target service flow.

In an exemplary embodiment, the UPF network element and/or the network device may obtain the target data detection rule and the target processing rule from an SMF network element.

In this embodiment of the present disclosure, the target service flow is a service flow formed by transmitting, on a network, a target data packet transmitted by a target terminal and/or a target service server, and is transmitted for one or more target services. The target service may be set according to an actual requirement, for example, may be video conferencing or network livestreaming.

In this embodiment of the present disclosure, the target data detection rule may be configured to detect a received to-be-forwarded data packet to determine whether the received to-be-forwarded data packet belongs to target data of the target service flow.

In this embodiment of the present disclosure, a group of data packets in a dependency relationship may be categorized as the same group of data packets. During packaging for data packets belonging to the same group, a corresponding group identifier may be encapsulated to indicate that the data packets belong to the group. Correspondingly, data packets belonging to the target service flow and belonging to the same group are referred to as target data packets belonging to a target group of the target service flow, and the target data packets have a target group identifier.

In this embodiment of the present disclosure, during determining whether different data packets have a dependency relationship, configuration may be performed based on an actual scenario. For example, in a case that a data packet transmits encoded image or video data, after receiving the encoded image or video data packet, a client side (which may correspond to a target terminal side) or a service server side (for example, a target service server below, where the target service server may be a server corresponding to the target service) decodes the data packet and determines whether reference needs to be made to another data packet. Different data packets with reference value during decoding may be considered as having a dependency relationship. Different data packets without reference value during decoding may be considered as having no dependency relationship.

The H.264 video coding standard is used as an example, and includes an I-frame, a P-frame, and a B-frame.

The I-frame is referred to as an intra-coded frame. A complete image can be reconstructed only by using data of the I-frame. Therefore, there is no dependency relationship between data packets including two different I-frames.

The P-frame is referred to as a forward-predictive coded frame. The P-frame records a difference from a previous frame (for example, an I-frame or a P-frame). Therefore, during decoding of the P-frame, reference needs to be made to the previous frame. In this case, the previous frame has reference value for the current to-be-decoded P-frame. Therefore, there is a dependency relationship between a data packet including the previous I-frame or P-frame and a data packet including the current to-be-decoded P-frame.

The B-frame is referred to as a bidirectional-predictive interpolated coded frame. When a frame is compressed into a B-frame, the frame is compressed based on data of an adjacent previous frame, the frame, and a next frame. To be specific, the B-frame records a difference from the previous frame and a difference from the next frame. Therefore, during decoding of the B-frame, reference needs to be made to the previous frame and the next frame, and the previous frame and the next frame have reference value for the decoding of the B-frame. Therefore, there is a dependency relationship between a data packet including the previous frame and a data packet including the B-frame and between a data packet including the next frame and the data packet including the B-frame.

For the same group of data packets with a dependency relationship, in a case that a data packet in the group is lost due to congestion or other causes, decoding of an image or a video corresponding to the group of data packets may not be completed on a client side or a server side. Therefore, network transmission may be correspondingly optimized.

In this embodiment of the present disclosure, after the target data packet belonging to the target group of the target service flow is determined according to the target data detection rule, the target processing rule is used for processing the target data packet.

In S320, a to-be-forwarded data packet is received.

In this embodiment of the present disclosure, the to-be-forwarded data packet may include a to-be-forwarded uplink data packet transmitted by the target terminal and received by the UPF network element, and/or may include a to-be-forwarded downlink data packet transmitted by the target service server and received by the UPF network element, and/or may include a to-be-forwarded uplink data packet transmitted by the target terminal and received by the network device, and/or may include a to-be-forwarded downlink data packet transmitted by the target service server and received by the network device.

In S330, a target data packet belonging to a target group of the target service flow is determined from the to-be-forwarded data packet based on target data packet distinguishing information and a target group identifier that are included in the target data detection rule.

In this embodiment of the present disclosure, the target data detection rule may include the target data packet distinguishing information and the target group identifier. The target data packet distinguishing information is any related information that can be used for distinguishing whether the to-be-forwarded data packet belongs to the target data packet in the target group of the target service flow, and may include at least one of target service flow template information, target data network name (DNN) information of the target service flow, target single network slice selection assistance information (S-NSSAI) information, and/or the like. The UPF network element and/or the network device may determine, based on the target data packet distinguishing information, whether the received to-be-forwarded data packet belongs to the target data packet in the target group.

In this embodiment of the present disclosure, the target group identifier is identification information used for indicating that the target data packet belongs to the target group.

In S340, data packet loss information of the target data packet in the target group is determined.

In this embodiment of the present disclosure, the UPF network element and/or the network device may obtain the data packet loss information in the target group, for example, may determine the data packet loss information in the target group based on the target group identifier and a packet sequence number of the received to-be-forwarded data packet. The data packet loss information may include a quantity of lost packets and/or a packet loss ratio of the target data packet, and may further include a packet sequence number of an exemplary lost target data packet or the like.

The packet loss ratio is a ratio of a quantity of lost data packets to a total quantity of data packets in the target group.

In S350, it is determined that the target group is a target to-be-discarded group based on the data packet loss information in the target group and a target-group data packet loss threshold included in the target processing rule.

The target-group data packet loss threshold may be set by a user of the target service, or may be set by an operation and maintenance perform of the target service in the background, for example, may be 100.

In this embodiment of the present disclosure, the target processing rule may include the target-group data packet loss threshold. The UPF network element and/or the network device may determine whether data packet loss information in the target group exceeds the target-group data packet loss threshold. In a case that the data packet loss information in the target group exceeds the target-group data packet loss threshold, it can be determined that the target group is a target to-be-discarded group, and a data packet in the target to-be-discarded group is referred to as a target data packet. In this way, a target data packet, in the target to-be-discarded group, that is still transmitted on a network (namely, not lost) is considered as a remaining data packet, and the remaining data packet is no longer transmitted on the network. For example, the remaining target data packet in the target to-be-discarded group may be discarded to reduce network transmission load.

In a case that the data packet loss information in the target group does not exceed the target-group data packet loss threshold, it can be determined that the target group is not a target to-be-discarded group. In this case, a remaining target data packet in the target group may be further transmitted on a network without affecting correct decoding of a data packet on the client side or the target service server side.

In this embodiment of the present disclosure, the target-group data packet loss threshold is used for determining acceptable data packet loss information in the target group, for example, one or more of an acceptable quantity of lost data packets, an acceptable packet loss ratio, an exemplary packet whose loss is acceptable, or the like.

For example, due to a fault tolerance and redundancy mechanism of a video decoding algorithm provided in the related art, correct decoding on the client side or the service server side is not affected even if some target data packets in the target group are lost within the target-group data packet loss threshold. After the target-group data packet loss threshold is exceeded, decoding on the client side or the service server side cannot be performed correctly.

It can be understood that the target data detection rule and the target processing rule may be combined into one rule, divided into different rules, used as a part of another rule, or used as a part of a quality of service (QoS) profile. The rules may have different names based on different execution entities. This is not limited in the embodiments of the present disclosure.

An example in which the UPF network element obtains the target data detection rule and the target processing rule is used below for description. In a case that the UPF network element performs the method shown in FIG. 3, S310 may include: The UPF network element obtains the target data detection rule and the target processing rule from the SMF network element.

S320 may include: The UPF network element receives a to-be-forwarded downlink data packet from the target service server. The to-be-forwarded data packet may include the to-be-forwarded downlink data packet.

S330 may include: The UPF network element determines a target downlink data packet belonging to the target group from the to-be-forwarded downlink data packet based on the target data packet distinguishing information and the target group identifier. The target data packet may include the target downlink data packet.

S340 may include: The UPF network element determines first downlink data packet loss information of the target downlink data packet in the target group. The data packet loss information may include the first downlink data packet loss information.

In this embodiment of the present disclosure, the first downlink data packet loss information is one or more of a quantity of lost packets, a packet loss ratio, a sequence number of a lost packet, or the like of the target downlink data packet in the target group.

S350 may include: The UPF network element determines whether the first downlink data packet loss information exceeds the target-group data packet loss threshold. In a case that the first downlink data packet loss information exceeds the target-group data packet loss threshold, the UPF network element determines that the target group is a target to-be-discarded group. After the UPF network element determines that the target group is a target to-be-discarded group, the UPF network element no longer transmits a remaining downlink data packet belonging to the target to-be-discarded group on the network, for example, no longer transmits the remaining downlink data packet to the network device.

In an exemplary embodiment, the target data detection rule may further include an uplink/downlink effective indication. The uplink/downlink effective indication may be used for indicating one of the following cases: The target data detection rule is effective for a target uplink data packet, the target data detection rule is effective for a target downlink data packets, or the target data detection rule is effective for both a target uplink data packet and a target downlink data packet.

In an exemplary embodiment, the determining that the target group is a target to-be-discarded group based on a target-group data packet loss threshold included in the target processing rule and the data packet loss information in the target group may include: The user plane function network element and/or the network device determine, based on the uplink/downlink effective indication, whether the target data detection rule is effective for an uplink service flow, a downlink service flow, or an uplink/downlink service flow of the target service flow; and in the case of determining that the target data detection rule is effective for a downlink service flow and determining that the target data packet belongs to a downlink service flow of the target service flow, determine whether the target group is a target to-be-discarded group based on the target-group data packet loss threshold and the data packet loss information; in the case of determining that the target data detection rule is effective for an uplink service flow and determining that the target data packet belongs to an uplink service flow of the target service flow, determine whether the target group is a target to-be-discarded group based on the target-group data packet loss threshold and the data packet loss information; or in the case of determining that the target data detection rule is effective for an uplink/downlink service flow, separately detect an uplink service flow and a downlink service flow of the target service flow, and determine whether a target group to which the uplink service flow or the downlink service flow belongs is a target to-be-discarded group based on the target-group data packet loss threshold and the data packet loss information.

In this embodiment of the present disclosure, S350 may include: The UPF network element determines whether the target data detection rule is effective in uplink, downlink, or uplink/downlink based on the uplink/downlink effective indication; and in the case of determining that the target data detection rule is effective in downlink or uplink/downlink, the UPF network element determines whether the first downlink data packet loss information exceeds the target-group data packet loss threshold; and in a case that the first downlink data packet loss information exceeds the target-group data packet loss threshold, the UPF network element determines that the target group is a target to-be-discarded group.

In this embodiment of the present disclosure, in a case that the uplink/downlink effective indication in the target data detection rule indicates that the target data detection rule is effective only for a target uplink data packet, even if the first downlink data packet loss information exceeds the target-group data packet loss threshold, the target group is not determined as a target to-be-discarded group, that is, the target downlink data packet is still transmitted on the network, for example, transmitted to the network device. Network transmission of the target data packet of the target service flow can be more accurately detected and processed based on the uplink/downlink effective indication.

S350 may further include: In a case that the first downlink data packet loss information does not exceed the target-group data packet loss threshold, the UPF network element transmits the target downlink data packet to the network device.

In an exemplary embodiment, the target-group data packet loss threshold may include a first target-group downlink data packet loss threshold. The UPF network element may determine whether the first downlink data packet loss information exceeds the first target-group downlink data packet loss threshold; and in a case that the first downlink data packet loss information exceeds the first target-group downlink data packet loss threshold, determine that the target group is a target to-be-discarded group; or in a case that the first downlink data packet loss information does not exceed the first target-group downlink data packet loss threshold, determine that the target group is not a target to-be-discarded group.

In a case that the network device performs the method shown in FIG. 3, S310 may further include: The network device obtains the target data detection rule and the target processing rule from the SMF network element.

In an exemplary embodiment, that the network device obtains the target data detection rule and the target processing rule from the SMF network element may include: The network device receives, through an AMF network element, quality of service (QoS) profile information transmitted by the SMF network element. The quality of service profile information may include the target data detection rule and the target processing rule. To be specific, the network device, for example, a base station, may obtain the target data detection rule and the target processing rule from the SMF network element through the AMF network element.

S320 may further include: The network device receives a target downlink data packets from the UPF network element. The to-be-forwarded data packet may include the target downlink data packet.

In an exemplary embodiment, a target downlink data packet transmitted by the target service server may be sequentially detected and processed by the UPF network element and the network device. To be specific, the UPF network element first detects a received target downlink data packet by using the target data detection rule, and then processes the target downlink data packet by using the target processing rule; and in a case that the UPF network element determines that the target group is a target to-be-discarded group, the UPF network element no longer transmits the target downlink data packet to the network device; or in a case that the UPF network element determines that the target group is not a target to-be-discarded group, the UPF network element continues to transmit the target downlink data packet to the network device. In a process of transmitting the target downlink data packet to the network device by the UPF network element, data loss may occur in the target downlink data packet. In this case, the network device may detect and process a received target downlink data packet by using the target data detection rule and the target processing rule.

In some embodiments, S330 may further include: The network device determines a target downlink data packet belonging to the target group from the received to-be-forwarded data packet based on the target data packet distinguishing information and the target group identifier.

In some embodiments, S340 may further include: The network device determines second downlink data packet loss information of the target downlink data packet in the target group. The data packet loss information may include the second downlink data packet loss information.

In this embodiment of the present disclosure, the first downlink data packet loss information is packet loss information of the target downlink data packet during network transmission from the target service server to the UPF network element. In some embodiments, the second downlink data packet loss information includes the first downlink data packet loss information, and may further include packet loss information of the target downlink data packet during network transmission from the UPF network element to the network device. Correspondingly, the second downlink data packet loss information is greater than or equal to the first downlink data packet loss information.

In some other embodiments, the second downlink data packet loss information may alternatively be independent of (in other words, not included in) the first downlink data packet loss information, and is packet loss information detected by the network device. Correspondingly, there is no specific association relationship between the second downlink data packet loss information and the first downlink data packet loss information.

In some embodiments, S350 may further include: The network device determines whether the second downlink data packet loss information exceeds the target-group data packet loss threshold. In a case that the second downlink data packet loss information exceeds the target-group data packet loss threshold, the network device determines that the target group is a target to-be-discarded group. To be specific, the network device may discard an unlost target downlink data packet in the target to-be-discarded group, that is, no longer transmit the unlost target downlink data packet to the target terminal. In a case that the network device determines that the target group is not a target to-be-discarded group, the network device continues to transmit the target downlink data packet to the target terminal. In this embodiment of the present disclosure, the UPF network element and the network device perform double detection and processing on the target downlink data packet, to further reduce network transmission load and improve network transmission efficiency.

In an exemplary embodiment, in a case that the uplink/downlink effective indication in the target data detection rule indicates that the target data detection rule is effective only for a target uplink data packet, even if the second downlink data packet loss information exceeds the target-group data packet loss threshold, the network device does not determine the target group as a target to-be-discarded group, that is, continues to transmit the target downlink data packet, for example, to the target terminal. Network transmission of the target data packet of the target service flow can be more accurately detected and processed based on the uplink/downlink effective indication.

In an exemplary embodiment, the target-group data packet loss threshold may include a second target-group downlink data packet loss threshold. The network device may determine whether the second downlink data packet loss information exceeds the second target-group downlink data packet loss threshold; and in a case that the second downlink data packet loss information exceeds the second target-group downlink data packet loss threshold, determine that the target group is a target to-be-discarded group; or in a case that the second downlink data packet loss information does not exceed the second target-group downlink data packet loss threshold, determine that the target group is not a target to-be-discarded group.

In this embodiment of the present disclosure, the first target-group downlink data packet loss threshold may or may not be equal to the second target-group downlink data packet loss threshold.

It can be understood that, in other embodiments, the UPF network element or the network device may be configured to detect and process the target downlink data packet transmitted by the target service server. This is not limited in the embodiments of the present disclosure. In addition, in a case that three or more communication equipment need to detect the target downlink data packet during network transmission, all the three or more communication equipment may obtain the target data detection rule and the target processing rule from the SMF network element to detect and process the target downlink data packet for three or more times.

In the following exemplary descriptions, the network device may detect and process, by using the target detection rule and the target processing rule, a to-be-forwarded uplink data packet transmitted by the target terminal such as UE.

In some embodiments, S320 may include: The network device receives a to-be-forwarded uplink data packet from the target terminal. The to-be-forwarded data packet may include the to-be-forwarded uplink data packet.

In some embodiments, S330 may include: The network device determines a target uplink data packet belonging to the target group from the to-be-forwarded uplink data packet based on the target data packet distinguishing information and the target group identifier. The target data packet may include the target uplink data packet.

In some embodiments, S340 may include: The network device determines first uplink data packet loss information of the target uplink data packet in the target group. The data packet loss information may include the first uplink data packet loss information.

S350 may include: The network device determines whether the first uplink data packet loss information exceeds the target-group data packet loss threshold; and in a case that the first uplink data packet loss information exceeds the target-group data packet loss threshold, the network device determines that the target group is a target to-be-discarded group.

In an exemplary embodiment, in a case that the target data detection rule further includes an uplink/downlink effective indication, S350 may include: The network device determines, based on the uplink/downlink effective indication, whether the target data detection rule is effective for an uplink service flow, a downlink service flow, or an uplink/ downlink service flow of the target service flow. In the case of determining that the target data detection rule is effective for an uplink service flow or an uplink/downlink service flow, the network device determines whether the first uplink data packet loss information exceeds the target-group data packet loss threshold. In a case that the first uplink data packet loss information exceeds the target-group data packet loss threshold, the network device determines that the target group is a target to-be-discarded group. In this case, the base station no longer transmits a target uplink data packet in the target to-be-discarded group on the network, for example, no longer transmits the target uplink data packet to the UPF network element, to reduce network transmission load.

In this embodiment of the present disclosure, in a case that the uplink/downlink effective indication in the target data detection rule indicates that the target data detection rule is effective only for a target downlink data packet, even if the first uplink data packet loss information exceeds the target-group data packet loss threshold, the target group is not determined as a target to-be-discarded group, that is, the target uplink data packet is still transmitted on the network, for example, transmitted to the UPF network element. Network transmission of the target data packet of the target service flow can be more accurately detected and processed based on the uplink/downlink effective indication.

Correspondingly, the target-group data packet loss threshold may include a first target-group uplink data packet loss threshold. The UPF network element may determine whether the first uplink data packet loss information exceeds the first target-group uplink data packet loss threshold; and in a case that the first uplink data packet loss information exceeds the first target-group uplink data packet loss threshold, determine that the target group is a target to-be-discarded group; or in a case that the first uplink data packet loss information does not exceed the first target-group uplink data packet loss threshold, determine that the target group is not a target to-be-discarded group.

In some embodiments, S350 may further include: In a case that the first uplink data packet loss information does not exceed the target-group data packet loss threshold, the network device transmits the target uplink data packet to the UPF network element.

In this embodiment of the present disclosure, when receiving the target uplink data packet from the network device such as a base station, the UPF network element may continue to detect and process the target uplink data packet by using the target data detection rule and the target processing rule.

In some embodiments, S320 may further include: The UPF network element receives the target uplink data packet from the network device. The to-be-forwarded data packet may include the target uplink data packet.

In some embodiments, S330 may further include: The UPF network element determines a target uplink data packet belonging to the target group from the received to-be-forwarded data packet based on the target data packet distinguishing information and the target group identifier.

In some embodiments, S340 may further include: The UPF network element determines second uplink data packet loss information of the target uplink data packet in the target group. The data packet loss information may include the second uplink data packet loss information.

In some embodiments, S350 may further include: The UPF network element determines whether the second uplink data packet loss information exceeds the target-group data packet loss threshold; and in a case that the second uplink data packet loss information exceeds the target-group data packet loss threshold, the UPF network element determines that the target group is a target to-be-discarded group.

In this embodiment of the present disclosure, in a case that the uplink/downlink effective indication in the target data detection rule indicates that the target data detection rule is effective only for a target downlink data packet, even if the second uplink data packet loss information exceeds the target-group data packet loss threshold, the UPF network element does not determine the target group as a target to-be-discarded group, that is, continues to transmit the target uplink data packet on the network, for example, to the target service server. Network transmission of the target data packet of the target service flow can be more accurately detected and processed based on the uplink/downlink effective indication.

Correspondingly, the target-group data packet loss threshold may include a second target-group uplink data packet loss threshold. The UPF network element may determine whether the second uplink data packet loss information exceeds the second target-group uplink data packet loss threshold; and in a case that the second uplink data packet loss information exceeds the second target-group uplink data packet loss threshold, determine that the target group is a target to-be-discarded group; or in a case that the second uplink data packet loss information does not exceed the second target-group uplink data packet loss threshold, determine that the target group is not a target to-be-discarded group.

In this embodiment of the present disclosure, the first target-group downlink data packet loss threshold, the second target-group downlink data packet loss threshold, the first target-group uplink data packet loss threshold, and the second target-group uplink data packet loss threshold may be the same or different, or may be partially the same and partially different. This is not limited in the present disclosure.

It can be understood that, in other embodiments, the UPF network element or the network device may be configured to detect and process the target uplink data packet transmitted by the target terminal. This is not limited in the present disclosure. In addition, in a case that three or more communication equipment need to detect the target uplink data packet during entire network transmission of the target uplink data packet, all the three or more communication equipment may obtain the target data detection rule and the target processing rule from the SMF network element to detect and process the target uplink data packet for three or more times.

In an exemplary embodiment, in a case that congestion occurs and some data packets need to be discarded, the UPF network element and/or the network device may determine the data packet loss information of the target data packet in the target group; and in a case that the UPF network element and/or the network device are not congested, the UPF network element and/or the network device are capable of transmitting all received target data packets, and may not need to determine the data packet loss information. However, the embodiments of the present disclosure are not limited thereto. In other embodiments, the UPF network element and/or the network device may still determine the data packet loss information without congestion. To be specific, the UPF network element and/or the network device are capable of transmitting all received target data packets; however, in a case that the UPF network element and/or the network device determine, based on the data packet loss information, that a received target data packet in the target group cannot be used even if the target data packet is successfully received by the target service server or the target terminal, the UPF network element and/or the network device may also discard the target data packet in the target group, to reduce network transmission load.

In the data packet transmission method provided in this embodiment of the present disclosure, a target data detection rule and a target processing rule for a target service flow are obtained. Therefore, when a to-be-forwarded data packet is received, a target data packet belonging to a target group of the target service flow may be determined from the to-be-forwarded data packet based on target data packet distinguishing information and a target group identifier that are included in the target data detection rule. Then whether the to-be-forwarded data packet belongs to a target to-be-discarded group may be determined based on a target-group data packet loss threshold included in the target processing rule and data packet loss information in the target group. When it is determined that the to-be-forwarded data packet belongs to the target to-be-discarded group, the to-be-forwarded data packet belonging to the target to-be-discarded group may not be further transmitted during network transmission. This optimizes a network transmission process, and reduces data transmission load of a network.

Figure 4:
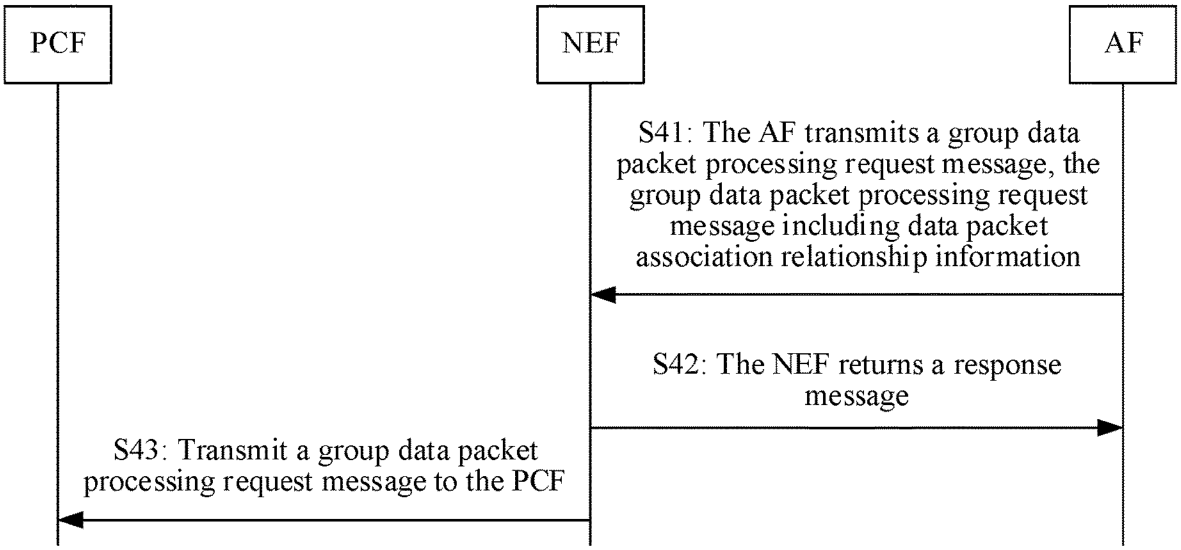
FIG. 4 is a schematic interaction diagram of a data packet transmission method according to an embodiment of the present disclosure.

An embodiment of FIG. 4 shows a schematic diagram of an interactive service requirement of an AF. As shown in FIG. 4, a method provided in this embodiment of the present disclosure may include the following steps:

In S41, an AF network element transmits a group data packet processing request message to a network exposure function (NEF) network element.

In this embodiment of the present disclosure, the group data packet processing request message may include data packet association relationship information and related information for determining whether a data packet can be discarded or no longer transmitted during network transmission.

For example, the data packet association relationship information may include a recoverable threshold for the same group of data packets.

In this embodiment of the present disclosure, the recoverable threshold for the same group of data packets is the foregoing target-group data packet loss threshold, and is used for indicating: In a case that a quantity of lost data packets or a loss ratio in the same group exceeds this value, processing on a target terminal side or a target service server side cannot be performed correctly, and consequently, other unlost data packets in the same group cannot be used; or in a case that a quantity of lost data packets or a loss ratio in the same group does not exceed this value, processing on a target terminal side or a target service server side can be performed correctly, that is, other unlost data packets in the same group can be used.

In some embodiments, the group data packet processing request message transmitted by the AF network element to the NEF network element may further include at least one of AF identification information (represented by an AF ID), a target group identifier of a target data packet, target service flow distinguishing information, and the like. The target service flow distinguishing information is the foregoing target data packet distinguishing information, and may include at least one of target service flow template information, target DNN information of the target service flow, target S-NSSAI information, and/or the like.

In an exemplary embodiment, the target service flow template information may include one or more of a source IP address (a source network address), a source port number, a destination IP address (a destination network address), a destination port number, a fully qualified domain name (FQDN), an application identity (APP ID), and the like of the target service flow.

In some embodiments, the data packet association relationship information transmitted by the AF network element to the NEF network element may further include a data packet quantity range of a target group. The data packet quantity range of the target group may be used for indicating a quantity of target data packets to be packaged by the target terminal and/or the target service server by using a target group identifier.

In this embodiment of the present disclosure, the data packet quantity range of the target group has an upper limit and a lower limit, and an average value may be further calculated. The target terminal and/or the target service server may select, based on an actual target service flow, the upper limit, the lower limit, or the average value to package the target data packets by using the target group identifier.

For example, in a case that the data packet quantity range of the target group is 1000-1200, the target terminal may determine, within the range of 1000-1200 according to a service requirement, a quantity of uplink data packets to be packaged by using the target group identifier. For example, during video or image transmission, in a case that a high resolution is required, 1200 target uplink data packets may be selected and packaged as belonging to the target group; or in a case that a low resolution is required, 1000 target uplink data packets may be selected and packaged as belonging to the target group. However, the embodiments of the present disclosure are not limited thereto.

In some embodiments, the data packet association relationship information transmitted by the AF network element to the NEF network element may alternatively include a plurality of (two or more) target-group data packet grades or target data packet levels. Different target-group data packet grades or target data packet levels indicate that different quantities of target data packets are marked by using a target group identifier as belonging to the same target group, to indicate the target terminal and/or the target service server to select a corresponding target-group data packet grade or target data packet level based on an actual target service flow.

In some embodiments, the data packet association relationship information transmitted by the AF network element to the NEF network element may further include a target-group data packet quantity. The target-group data packet quantity may be used for indicating a quantity of target data packets to be packaged by the target terminal and/or the target service server by using a target group identifier. To be specific, the data packet association relationship information may alternatively indicate, by using a specific value, a quantity of target data packets to be categorized by the target terminal and/or the target service server into one target group.

In S42, the NEF network element returns a response message to the AF network element.

In this embodiment of the present disclosure, the AF network element may transmit the group data packet processing request message to the NEF network element, where the group data packet processing request message may carry the data packet association relationship information. After receiving the group data packet processing request message transmitted by the AF network element, the NEF network element may authenticate the group data packet processing request message, generate a corresponding response message, and return the response message to the AF network element. The group data packet processing request message may include a first request message and a second request message described below. Correspondingly, the response message may include a first response message and a second response message described below.

In an example of authentication, the AF network element adds an authentication code, such as a token or a media access control (MAC) address, to the group data packet processing request message, encrypts the message, and transmits the message to the NEF network element. The NEF network element performs an authentication operation on a decrypted message by using an agreed-upon algorithm, and compares an obtained authentication code with the received authentication code. In a case that the two authentication codes are the same, the authentication succeeds, and the NEF network element determines that the group data packet processing request message is valid. Otherwise, the authentication fails, and the NEF network element determines that the group data packet processing request message is invalid, and does not respond.

The response message may include indication information indicating whether the request message is approved. In a case that the authentication on the group data packet processing request message succeeds, the indication information indicates that the group data packet processing request message is approved. In a case that the authentication on the group data packet processing request message fails, the indication information indicates that the group data packet processing request message is rejected. In some embodiments, the indication information may further include a rejection cause value.

In some embodiments, in a case that the group data packet processing request message transmitted by the AF network element to the NEF network element does not include a target group identifier, the response message may further include a target group identifier.

In S43, the NEF network element transmits a group data packet processing request message to a PCF.

For example, the NEF network element directly or indirectly transmits the group data packet processing request message to the PCF network element.

In this embodiment of the present disclosure, after the NEF network element successfully authenticates the group data packet processing request message, the NEF network element may transmit data packet association relationship information, target service flow distinguishing information, and the like that are carried in the group data packet processing request message to the PCF network element as group data packet processing request information. The group data packet processing request information is related information for requesting to process a target data packet belonging to a target group of a target service flow. The processing herein includes detecting whether a data packet belongs to the target data packet of the target group of the target service flow. In the case of detecting that the data packet belongs to the target data packet, whether to discard the target data packet is determined.

After receiving the group data packet processing request information transmitted by the NEF network element, the PCF network element may generate a group data packet processing policy rule based on the group data packet processing request information. For example, the group data packet processing policy rule may be a policy and charging control (PCC) rule. The PCC rule carries the data packet association relationship information. Then the PCF network element transmits the PCC rule to an SMF network element, and the SMF network element generates a target data detection rule and a target processing rule for the target service flow according to the PCC rule including the data packet association relationship information.

In this embodiment of the present disclosure, the SMF network element may generate a target service flow template based on the target service flow template information. The PCF network element may obtain the target service flow template information from the group data packet processing request message transmitted by the AF network element, or may obtain the target service flow template information in another manner. This is not limited in the present disclosure.

In this embodiment of the present disclosure, the target service flow template may include one or more of a source IP address, a source port number, a destination IP address, a destination port number, an FQDN, an APP ID, the Internet Protocol (IP), and the like.

In this embodiment of the present disclosure, the target data detection rule may include the target group identifier. The target group identifier may be used for indicating whether a to-be-forwarded data packet belongs to the target group.

In some embodiments, the target data detection rule may also indicate whether the target data detection rule is effective for an uplink service flow, a downlink service flow, or both an uplink service flow and a downlink service flow. That is, the target data detection rule may further include the uplink/downlink effective indication.

For example, in a case that the target service flow template in the target data detection rule includes the FQDN, the uplink/downlink effective indication may be further used for indicating whether the target data detection rule is effective for an uplink service flow, a downlink service flow, or both an uplink service flow and a downlink service flow. For example, assuming that the uplink/downlink effective indication is used for indicating that the target data detection rule is effective only for an uplink service flow, only a target uplink data packet corresponding to the uplink service flow is detected and processed even if it is detected that the target data packet includes the target group identifier.

In this embodiment of the present disclosure, the target processing rule may include the target-group data packet loss threshold. In a case that data packet loss information in the target group exceeds the target-group data packet loss threshold, other unlost target data packets in the target group are discarded.

In this embodiment of the present disclosure, the SMF network element may define different data detection rules, and one or a combination of the data detection rules may be used as the target data detection rule.

In this embodiment of the present disclosure, the SMF network element may reuse a packet detection rule (PDR) as the target data detection rule, that is, add the target group identifier to the PDR. An exemplary PDR rule to which the target group identifier is to be added and how to add the target group identifier to the PDR rule may be flexibly set. In some embodiment, the SMF network element may add a new target data detection rule and target processing rule for group data packet processing.

In the data packet transmission method provided in this embodiment of the present disclosure, on the one hand, the AF network element may transmit a request message to the NEF network element, where the request message carries a target-group data packet loss threshold and an AF ID, and target data packet distinguishing information may be obtained based on the AF ID, or the request message directly carries the target data packet distinguishing information; and on the other hand, the NEF network element may further obtain a target group identifier from the AF network element, or the NEF network element determines a target group identifier, so that the NEF network element can transmit the target-group data packet loss threshold, the target data packet distinguishing information, and the target group identifier to the PCF network element. Then the PCF network element transmits the target-group data packet loss threshold, the target data packet distinguishing information, and the target group identifier to the SMF network element, so that the SMF network element can generate a target data detection rule and a target processing rule based on target-group data packet loss threshold, the target data packet distinguishing information, and the target group identifier. Network transmission of a to-be-forwarded data packet such as a media data packet may be optimized by using the generated target data detection rule and target processing rule. In a case that a group of data packets have a dependency relationship, a data packet in the group is lost due to congestion or other causes, and data packet loss information exceeds the target-group data packet loss threshold, decoding of an image or a video corresponding to the group of data packets cannot be completed on a client side or a service server side. In this case, network transmission may be correspondingly optimized. To be specific, other unlost data packets in the target group are discarded.

Figure 5:
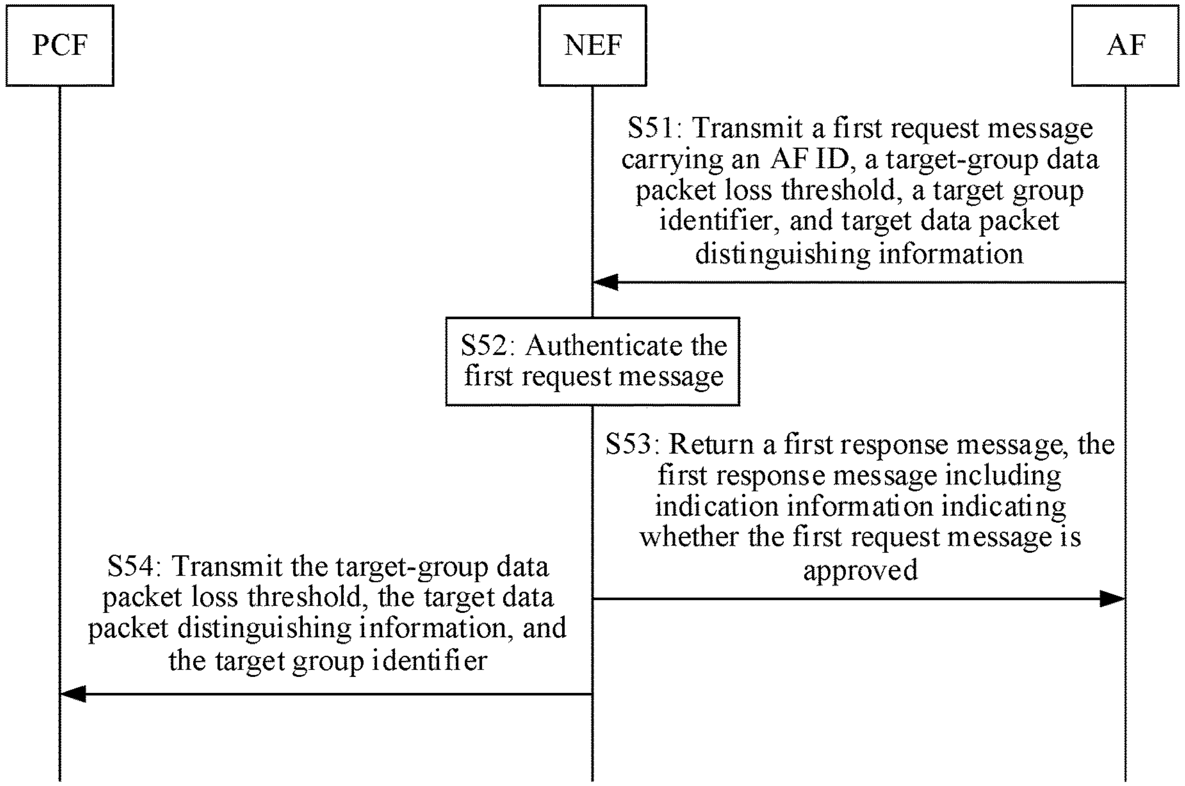
FIG. 5 is a schematic interaction diagram of a data packet transmission method according to another embodiment of the present disclosure.

FIG. 5 is a schematic interaction diagram of a data packet transmission method according to another embodiment of the present disclosure.

As shown in FIG. 5, the method provided in this embodiment of the present disclosure may include S51 to S54. Details are described below.

In S51, an AF network element transmits a first request message to an NEF network element. The first request message carries an AF ID, a target-group data packet loss threshold, a target group identifier, and target data packet distinguishing information.

The target data packet distinguishing information may include at least one of target service flow template information, target DNN information, and/or target S-NSSAI information.

In the embodiment of FIG. 5, the first request message transmitted by the AF network element to the NEF network element directly carries at least one of the target service flow template information, the target DNN information, and/or the target S-NSSAI information, and the first request message further carries the target group identifier, to be specific, the AF network element notifies the NEF network element of a group identifier that is the target group identifier to be detected and processed.

In S52, the NEF network element receives the first request message transmitted by the AF network element, and authenticates the first request message.

In S53, the NEF network element returns a first response message to the AF network element. The first response message includes indication information indicating whether the first request message is approved.

In the embodiment of FIG. 5, the first request message transmitted by the AF network element already carries the target group identifier. Therefore, the first response message returned by the NEF network element to the AF network element may not carry the target group identifier.

In S54, the NEF network element directly or indirectly transmits the target data packet distinguishing information, the target-group data packet loss threshold, and the target group identifier to a PCF network element.

For exemplary content of S54, reference may be made to the foregoing other embodiments.

In the data packet transmission method provided in this embodiment of the present disclosure, on the one hand, the first request message transmitted by the AF network element directly carries at least one of the target service flow template information, the target DNN information, and/or the target S-NSSAI information, so that a quantity of times of interaction between the AF network element and the NEF network element can be reduced; and on the other hand, the first request message transmitted by the AF network element directly carries the target group identifier, so that the NEF network element does not need to specify a target group identifier, and a target service server and/or a target terminal may specify a personalized target group identifier.

Figure 6:
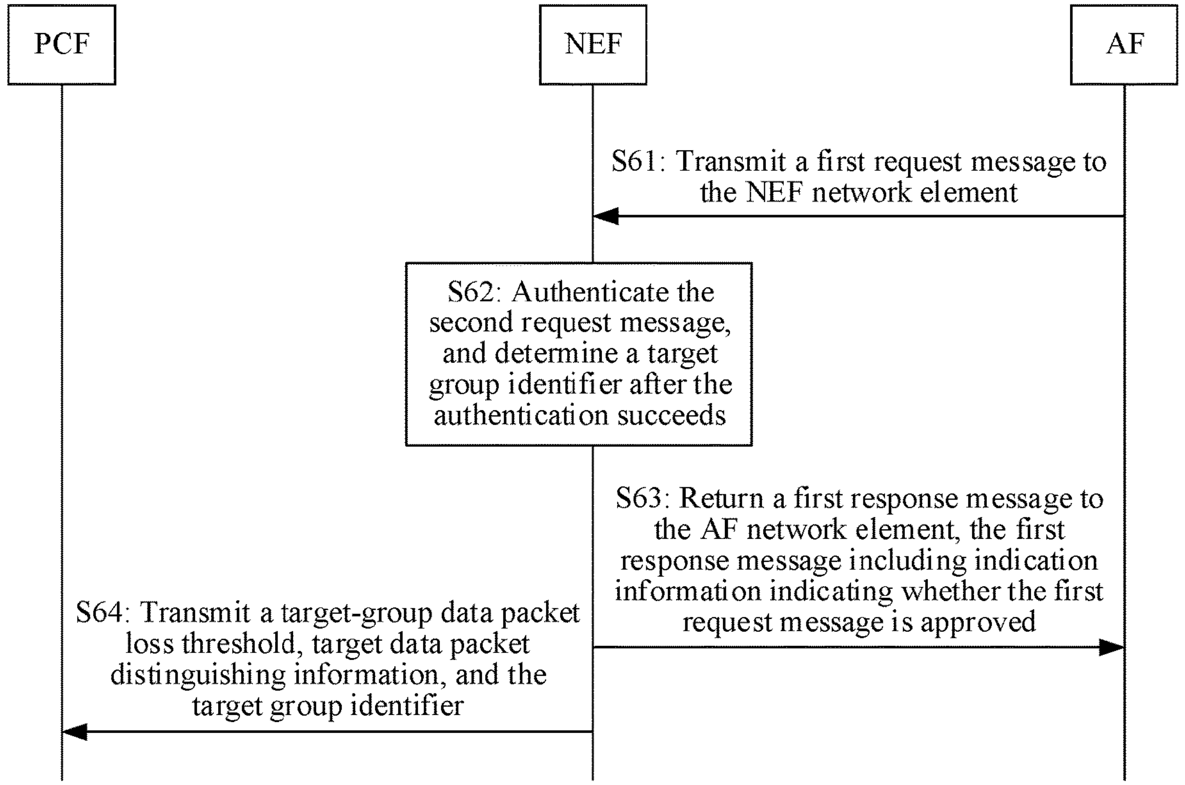
FIG. 6 is a schematic interaction diagram of a data packet transmission method according to still another embodiment of the present disclosure.

FIG. 6 is a schematic interaction diagram of a data packet transmission method according to still another embodiment of the present disclosure.

As shown in FIG. 6, the method provided in this embodiment of the present disclosure may include S61 to S64. Details are described below.

In S61, an AF network element transmits a first request message to an NEF network element.

The first request message carries an AF ID, a target-group data packet loss threshold, and target data packet distinguishing information. The target data packet distinguishing information includes at least one of target service flow template information, target DNN information, and/or target S-NSSAI information. The first request message does not include a target group identifier.

A difference between the embodiment of FIG. 6 and the embodiment of FIG. 5 lies in that the AF network element does not specify a target group identifier in the first request message transmitted to the NEF network element.

In S62, the NEF network element receives the first request message transmitted by the AF network element, and authenticates the first request message.

In the embodiment of FIG. 6, the first request message transmitted by the AF network element does not include a target group identifier. Therefore, after the authentication succeeds, the NEF network element (namely, a network side) may specify a target group identifier.

In S63, the NEF network element returns a first response message to the AF network element. The first response message includes indication information indicating whether the first request message is approved.

In a case that the authentication succeeds, the first response message may further include a target group identifier determined by the NEF network element.

In S64, the NEF network element transmits the target data packet distinguishing information, the target-group data packet loss threshold, and the target group identifier to a PCF network element.

For exemplary content of S64, reference may be made to the foregoing other embodiments.

In the data packet transmission method provided in this embodiment of the present disclosure, on the one hand, the first request message transmitted by the AF network element directly carries at least one of the target service flow template information, the target DNN information, and/or the target S-NSSAI information, so that a quantity of times of interaction between the AF network element and the NEF network element can be reduced; and on the other hand, the first request message transmitted by the AF network element do not carry a target group identifier, and the NEF network element specifies a target group identifier, to avoid a conflict between target group identifiers configured by different AF network elements.

In this embodiment of the present disclosure, the AF network element may be a functional unit abstracted from a target service server. Therefore, after the AF network element configures or obtains, from the NEF network element, a target group identifier, the target service server can learn of how to package the target group identifier with a target downlink data packet based on the target group identifier.

Figure 7:
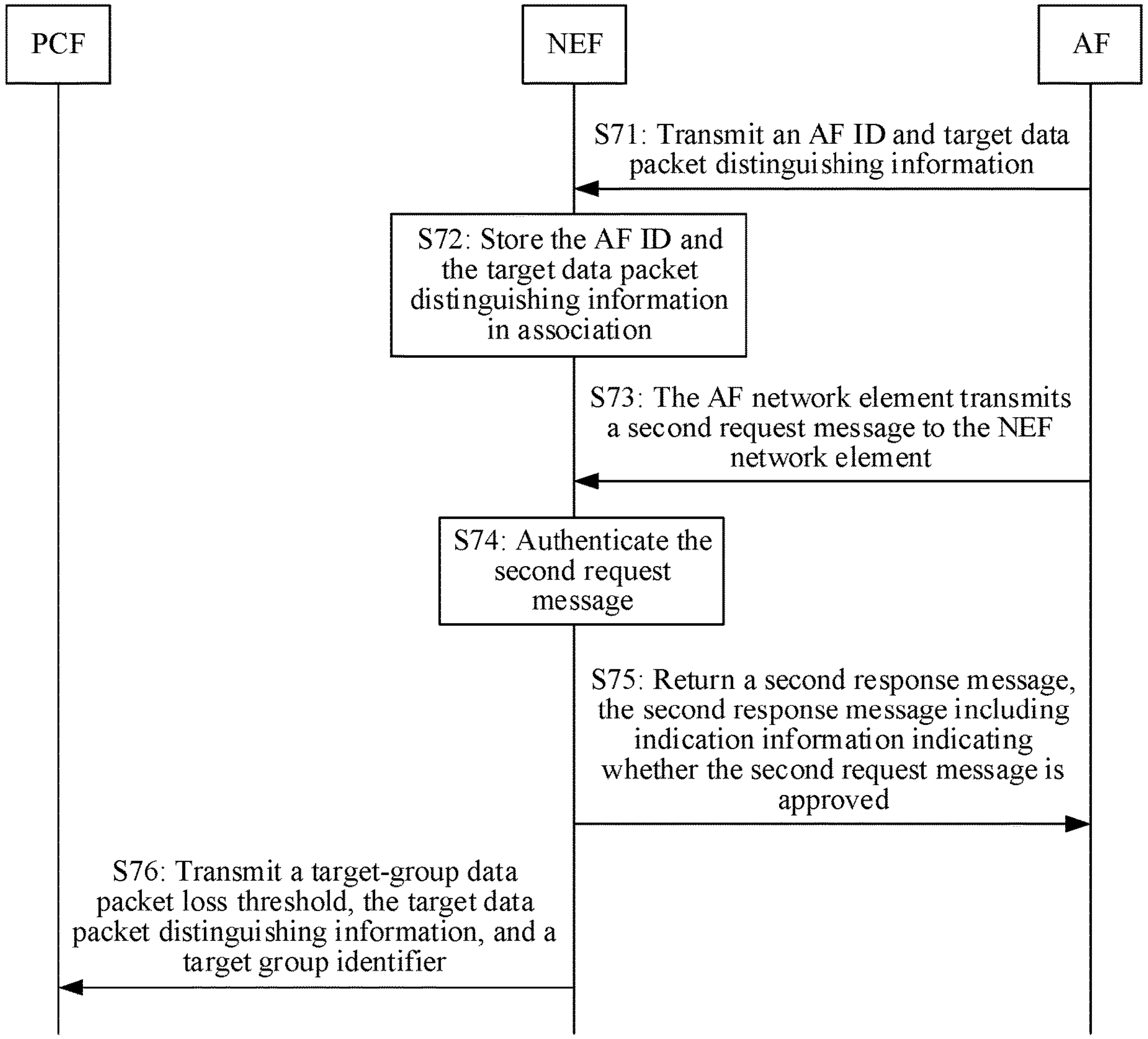
FIG. 7 is a schematic interaction diagram of a data packet transmission method according to yet another embodiment of the present disclosure.

FIG. 7 is a schematic interaction diagram of a data packet transmission method according to yet another embodiment of the present disclosure.

As shown in FIG. 7, the method provided in this embodiment of the present disclosure may include S71 to S76. Details are described below.

In S71, an AF network element transmits an AF ID and target data packet distinguishing information to an NEF network element. The target data packet distinguishing information includes target service flow template information, target DNN information, and/or target S-NSSAI information.

In S72, the NEF network element receives the AF ID and the target data packet distinguishing information transmitted by the AF network element, and stores the AF ID and the target data packet distinguishing information in association.

In S73, the AF network element transmits a second request message to the NEF network element.

The second request message carries the AF ID, a target group identifier, and the target-group data packet loss threshold.

In S74, the NEF network element receives the second request message transmitted by the AF network element, and authenticates the second request message.

After the authentication on the second request message succeeds, the NEF network element may search the associated storage based on the AF ID carried in the second request message to obtain the target service flow template information, the target DNN information, and/or the target S-NSSAI information.

In S75, the NEF network element returns a second response message to the AF network element. The second response message includes indication information indicating whether the second request message is approved.

In S76, the NEF network element directly or indirectly transmits the target data packet distinguishing information, the target-group data packet loss threshold, and the target group identifier to a PCF network element.

In the data packet transmission method provided in this embodiment of the present disclosure, the NEF network element may obtain the target service flow template information, the target DNN information, and/or the target S-NSSAI information from the AF network element in advance, and the NEF network element may store the AF ID in association with the target service flow template information, the target DNN information, and/or the target S-NSSAI information. In this way, when the AF network element transmits the second request message to the NEF network element, the second request message may not include the target service flow template information, the target DNN information and/or the target S-NSSAI information, but only needs to carry the AF ID, the target group identifier, and the target-group data packet loss threshold, to reduce an amount of data carried in the second request message. The target service flow template information, the target DNN information, and/or the target S-NSSAI information may be found from the associated storage based on the AF ID carried in the second request message, and transmitted to the PCF network element to generate a target data detection rule and a target processing rule.

Figure 8:
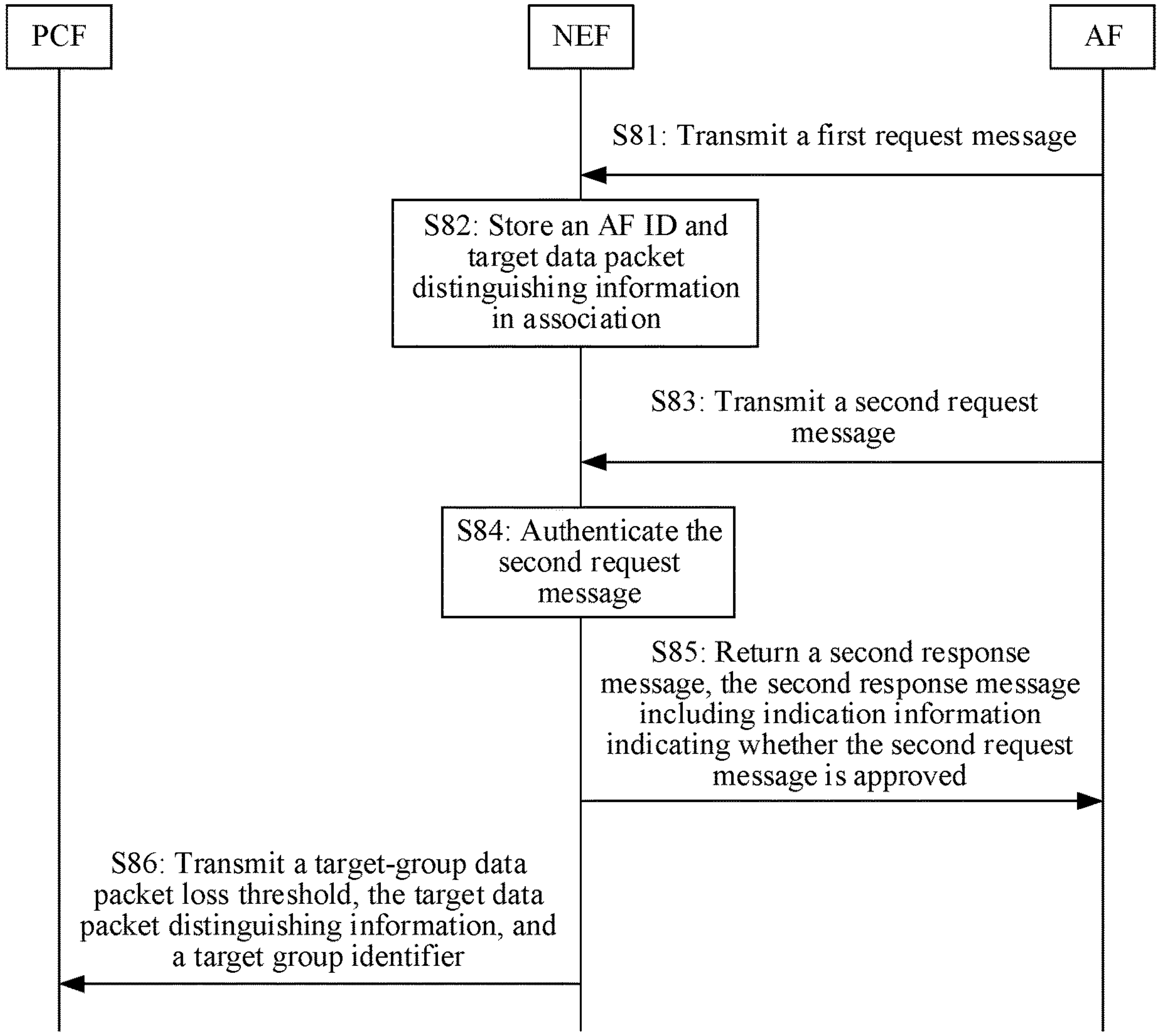
FIG. 8 is a schematic interaction diagram of a data packet transmission method according to yet another embodiment of the present disclosure.

FIG. 8 is a schematic interaction diagram of a data packet transmission method according to yet another embodiment of the present disclosure.

As shown in FIG. 8, the method provided in this embodiment of the present disclosure may include S81 to S86. Details are described below.

In S81, an AF network element transmits a first request message to an NEF network element.

The first request message carries an AF ID and target data packet distinguishing information. The target data packet distinguishing information includes at least one of target service flow template information, target DNN information, and/or target S-NSSAI information. The first request message may not include a target group identifier.

In S82, the NEF network element receives the first request message transmitted by the AF network element, and stores the AF ID and the target data packet distinguishing information in association based on the first request message.

In S83, the AF network element transmits a second request message to the NEF network element. The second request message carries the AF ID, the target-group data packet loss threshold, and the target group identifier.

In S84, the NEF network element receives the second request message transmitted by the AF network element, and authenticates the second request message.

In S85, the NEF network element returns a second response message to the AF network element. The second response message includes indication information indicating whether the second request message is approved.

The second request message carries the target group identifier. Therefore, the second response message herein may not include the target group identifier.

In S86, the NEF network element directly or indirectly transmits the target-group data packet loss threshold, the target data packet distinguishing information, and the target group identifier to a PCF network element.

In the data packet transmission method provided in this embodiment of the present disclosure, the first request message transmitted by the AF network element to the NEF network element in advance may not include a target group identifier, and the target group identifier is carried in the second request message.

Figure 9:
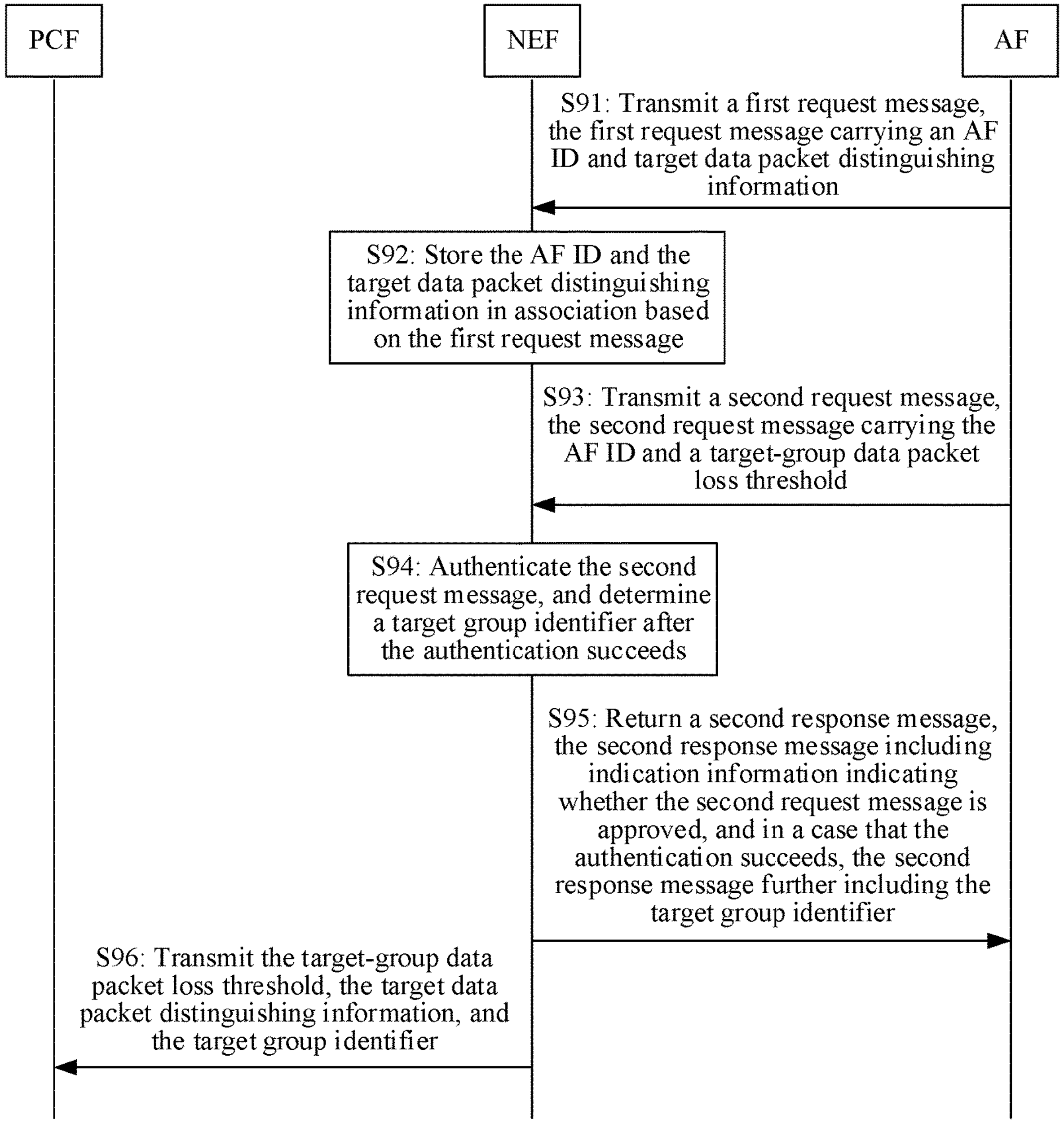
FIG. 9 is a schematic interaction diagram of a data packet transmission method according to yet another embodiment of the present disclosure.

FIG. 9 is a schematic interaction diagram of a data packet transmission method according to yet another embodiment of the present disclosure.

As shown in FIG. 9, the method provided in this embodiment of the present disclosure may include S91 to S96. Details are described below.

In S91, an AF network element transmits a first request message to an NEF network element. The first request message carries an AF ID and target data packet distinguishing information. The target data packet distinguishing information includes at least one of target service flow template information, target DNN information, and/or target S-NSSAI information. The first request message may not include a target group identifier.

In S92, the NEF network element receives the first request message transmitted by the AF network element, and stores the AF ID and the target data packet distinguishing information in association based on the first request message.

In S93, the AF network element transmits a second request message to the NEF network element. The second request message carries the AF ID and the target-group data packet loss threshold.

In S94, the NEF network element receives the second request message transmitted by the AF network element, authenticates the second request message, and determines a target group identifier after the authentication succeeds.

In S95, the NEF network element returns a second response message to the AF network element. The second response message includes indication information indicating whether the second request message is approved.

In the embodiment of FIG. 9, neither the first request message nor the second request message carries a target group identifier. Therefore, in a case that the authentication on the second request message succeeds, the second response message may further include the target group identifier determined by the NEF network element.

In S96, the NEF network element directly or indirectly transmits the target data packet distinguishing information, the target-group data packet loss threshold, and the target group identifier to a PCF network element.

In the data packet transmission method provided in this embodiment of the present disclosure, the first request message and the second request message transmitted by the AF network element to the NEF network element in advance may not include a target group identifier, and the NEF network element specifies a target group identifier, to avoid a conflict between target group identifiers specified by different AFs.

It can be understood that, although an example in which the AF network element and the PCF network element exchange information through the NEF network element is used in the embodiments of FIG. 4 to FIG. 9, the embodiments of the present disclosure are not limited therefore. In other embodiments, the AF network element may directly communicate with the PCF network element, to be specific, the PCF network element directly obtains data packet association relationship information from the AF network element. In one embodiment, the NEF network element may store information requested by the AF on a UDR network element, and the PCF network element may receive the information from the UDR network element.

Figure 10:
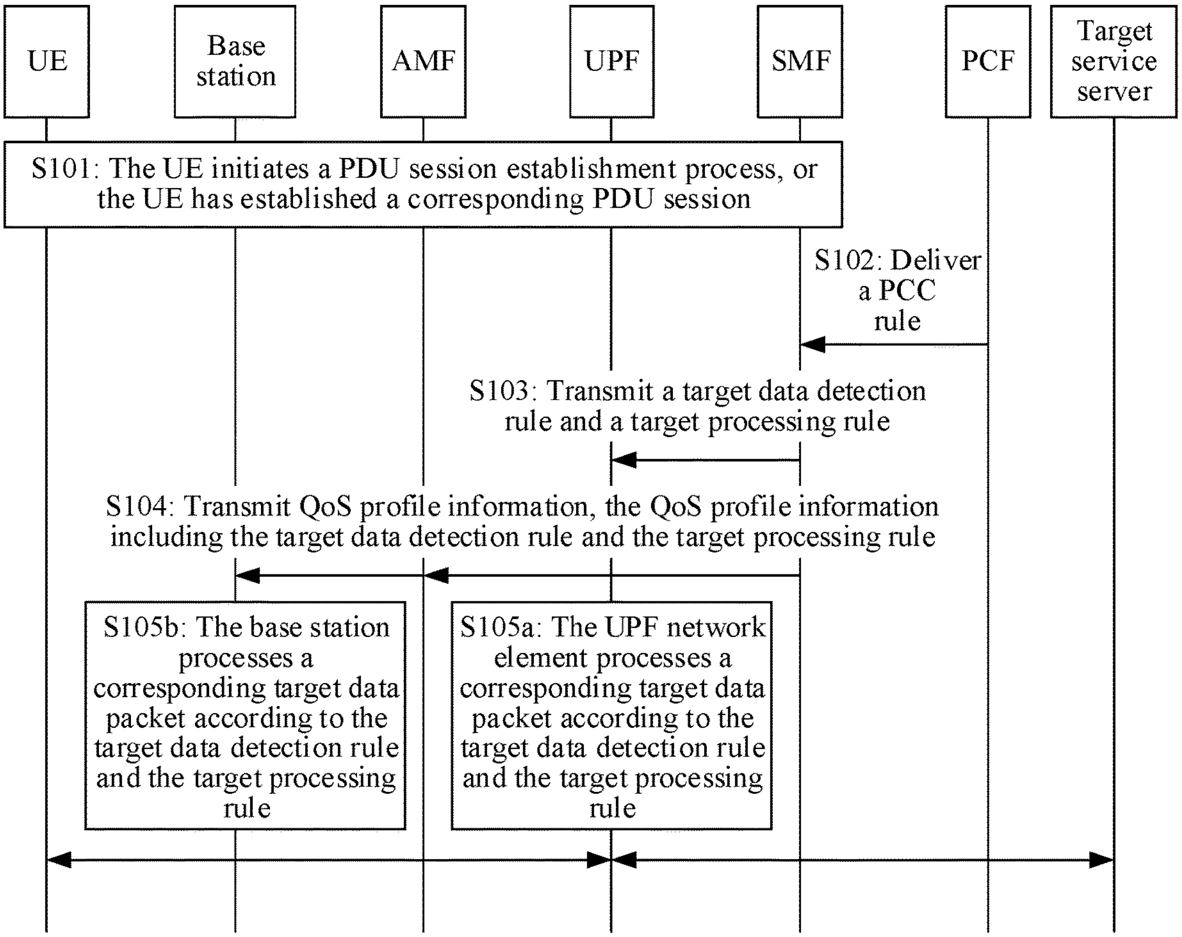
FIG. 10 is a schematic interaction diagram of a data packet transmission method according to yet another embodiment of the present disclosure.

FIG. 10 is a schematic diagram of policy execution on a network side. An example in which UE serves as a target terminal and a base station serves as a network device is used in the embodiment of FIG. 10. As shown in FIG. 10, a method provided in this embodiment of the present disclosure may include the following steps:

In S101, the UE initiates a protocol data unit (PDU) session establishment process, or the UE has established a corresponding PDU session.

In this embodiment of the present disclosure, the UE has established a PDU session for a target service (for example, for an exemplary target DNN or target S-NSSAI), or the UE initiates PDU session establishment for a target service (for example, for an exemplary target DNN or target S-NSSAI).

In S102, a PCF network element transmits a PCC rule to an SMF network element.

In S103, the SMF network element receives the PCC rule transmitted by the PCF network element.

A target data detection rule and a target processing rule are generated based on data packet association relationship information carried in the PCC rule, and the target data detection rule and the target processing rule are transmitted to a UPF network element.

In S104, the SMF network element transmits QoS profile information to an AMF network element. The QoS profile information includes the target data detection rule and the target processing rule.

In this embodiment of the present disclosure, the SMF network element transmits the QoS profile information or updated QoS profile information to the AMF network element. The QoS profile information includes the target data detection rule and the target processing rule.

The AMF network element receives the QoS profile information transmitted by the SMF network element, and transmits the QoS profile information to the base station.

The base station receives the QoS profile information transmitted by the AMF network element.

In this embodiment of the present disclosure, the UPF network element and the base station are two points prone to congestion. Therefore, the target data detection rule and the target processing rule may be configured on the UPF network element and the base station to separately detect and process a target uplink data packet transmitted by the UE and a target downlink data packet transmitted by a target service server.

In S105*a*, the UPF network element processes a corresponding target data packet according to the target data detection rule and the target processing rule.

The UPF network element processes a target service flow according to the target data detection rule and the target processing rule. In the case of detecting that data packet loss information, for example, a quantity of lost packets, of target data packets in the same target group exceeds a target-group data packet loss threshold, other target data packets in the target group are discarded.

In S105*b*, the base station processes a corresponding target data packet according to the target data detection rule and the target processing rule.

The base station processes a target service flow according to the target data detection rule and the target processing rule. In the case of detecting that data packet loss information, for example, a quantity of lost packets, of target data packets in the same target group exceeds a target-group data packet loss threshold, other target data packets in the target group are discarded.

The same target uplink data packet or downlink data packet may be detected and processed by both the base station and the UPF network element. For example, for a target uplink data packet, a target uplink data packet transmitted by the UE to the base station is first detected by the base station. Assuming that the target-group data packet loss threshold is 50%, in a case that the base station detects that data packet loss information is 30%, the base station continues to normally transmit the target uplink data packet to the UPF network element. Then the UPF network element performs detection. If packet loss occurs again between the base station and the UPF network element and data packet loss information reaches 60%, the UPF network element discards target data packets in the entire target group.

As execution sequence of S102, S103, and S104 in the embodiment of FIG. 10 is not limited, and S102, S103, and S104 may be performed in parallel. As execution sequence of S105*a* and S105*b* is not limited, and S105*a* and S105*b* may be performed in parallel.

In the data packet transmission method provided in this embodiment of the present disclosure, network transmission of a data packet is optimized. In a case that a group of data packets have a dependency relationship, a data packet in the group is lost due to congestion or other causes, and decoding of an image or a video corresponding to the group of data packets cannot be completed on a client side or a service server side due to the loss, network transmission may be correspondingly optimized to reduce data transmission load of the network.

Figure 11:
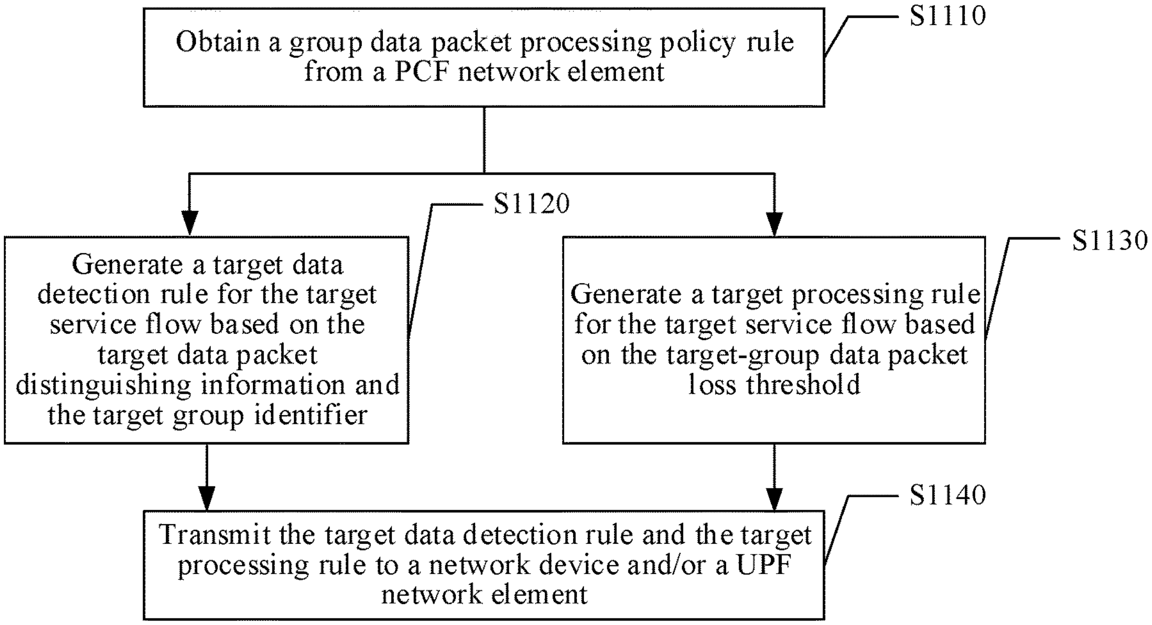
FIG. 11 is a flowchart of a data packet transmission method according to another embodiment of the present disclosure.

FIG. 11 is a flowchart of a data packet transmission method according to another embodiment of the present disclosure. The method provided in the embodiment of FIG. 11 may be performed by an SMF network element.

As shown in FIG. 11, the method provided in this embodiment of the present disclosure may include S1110 to S1140. Details are described below.

In S1110, a group data packet processing policy rule is obtained from a PCF network element.

The group data packet processing policy rule includes a target group identifier of a target service flow, a target-group data packet loss threshold, and target data packet distinguishing information.

In S1120, a target data detection rule for the target service flow is generated based on the target data packet distinguishing information and the target group identifier.

In S1130, a target processing rule for the target service flow is generated based on the target-group data packet loss threshold.

In S1140, the target data detection rule and the target processing rule are transmitted to a network device and/or a UPF network element.

The target data detection rule may be used for indicating the network device and/or the UPF network element to determine, from a received to-be-forwarded data packet, a target data packet belonging to a target group of the target service flow based on the target data packet distinguishing information and the target group identifier that are included in the target data detection rule.

The target processing rule may be used for indicating the network device and/or the UPF network element to determine that the target group is a target to-be-discarded group based on data packet loss information in the target group and the target-group data packet loss threshold included in the target processing rule.

In an exemplary embodiment, the transmitting the target data detection rule and the target processing rule to a network device may include: transmitting quality of service (QoS) profile information to an AMF network element, the quality of service profile including the target data detection rule and the target processing rule, and the quality of service profile being used for indicating the AMF network element to transmit the quality of service profile to the network device.

For other content of the embodiment of FIG. 11, reference may be made to the foregoing other embodiments.

Figure 12:
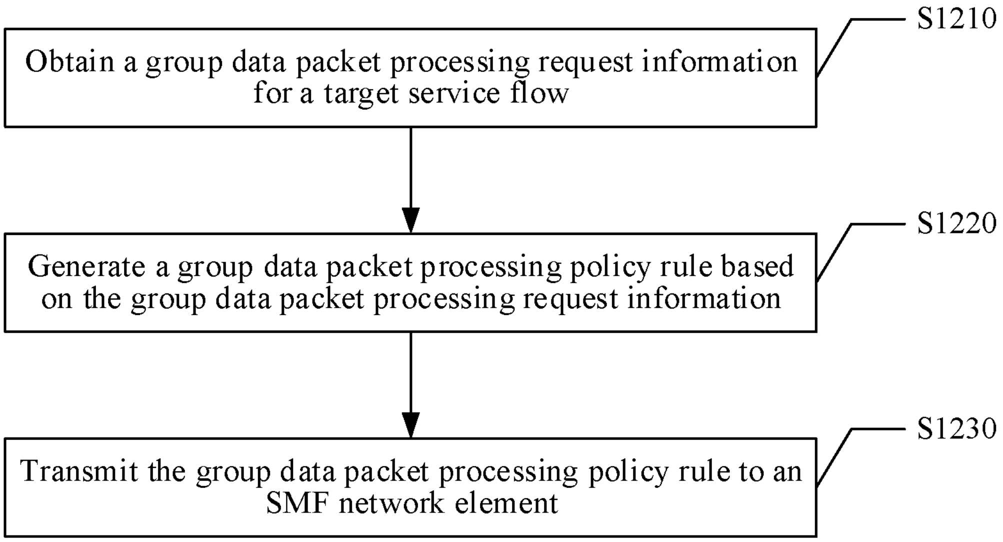
FIG. 12 is a flowchart of a data packet transmission method according to still another embodiment of the present disclosure.

FIG. 12 is a flowchart of a data packet transmission method according to still another embodiment of the present disclosure. The method provided in the embodiment of FIG. 12 may be performed by a PCF network element.

As shown in FIG. 12, the method provided in this embodiment of the present disclosure may include S1210 to S1230. Details are described below.

In S1210, a group data packet processing request information for a target service flow is obtained.

The group data packet processing request information may include a target group identifier, target data packet distinguishing information, and a target-group data packet loss threshold.

In an exemplary embodiment, the PCF network element may obtain the group data packet processing request information for the target service flow from an AF network element, an NEF network element, or a UDR network element.

In S1220, a group data packet processing policy rule, for example, a PCC rule, is generated based on the group data packet processing request information.

In S1230, the group data packet processing policy rule, for example, the PCC rule, that includes the target data packet distinguishing information, the target group identifier, and the target-group data packet loss threshold is transmitted to an SMF network element.

The target data packet distinguishing information and the target group identifier may be used for indicating the SMF network element to generate a target data detection rule for the target service flow and transmit the target data detection rule to a network device and/or a UPF network element.

The target-group data packet loss threshold may be used for indicating the SMF network element to generate a target processing rule for the target service flow and transmit the target processing rule to the network device and/or the UPF network element.

The target data detection rule may be used for indicating the network device and/or the UPF network element to determine, from a received to-be-forwarded data packet, a target data packet belonging to a target group of the target service flow based on the target data packet distinguishing information and the target group identifier that are included in the target data detection rule.

The target processing rule may be used for indicating the network device and/or the UPF network element to determine that the target group is a target to-be-discarded group based on data packet loss information in the target group and the target-group data packet loss threshold included in the target processing rule.

For other content of the embodiment of FIG. 12, reference may be made to the foregoing other embodiments.

An embodiment of the present disclosure provides a data packet transmission method. The method is performed by an AF network element, and the method may include: transmitting group data packet processing request information to a policy control function network element, the group data packet processing request information including a target group identifier, a target-group data packet loss threshold, and target data packet distinguishing information, and the target-group data packet loss threshold, the target group identifier, and the target data packet distinguishing information being used for indicating the policy control function network element to generate a group data packet processing policy rule, for example, a PCC rule, and transmit, to a session management function network element, the group data packet processing policy rule, for example, the PCC rule, that includes the target-group data packet loss threshold, the target group identifier, and the target data packet distinguishing information.

In an exemplary embodiment, the transmitting group data packet processing request information to a policy control function network element may include: transmitting the target data packet distinguishing information and the target data packet loss threshold to a network exposure function network element, the target data packet distinguishing information and the target-group data packet loss threshold being used for indicating the network exposure function network element to transmit the target data packet distinguishing information, the target group identifier, and the target-group data packet loss threshold to the policy control function network element.

In an exemplary embodiment, the transmitting the target data packet distinguishing information and the target data packet loss threshold to a network exposure function network element may include: transmitting a first request message to the network exposure function network element, the first request message including application function identification information, the target-group data packet loss threshold, and the target data packet distinguishing information, and the first request message indicating the network exposure function network element to authenticate the first request message and generate a first response message based on an authentication result; and receiving the first response message returned by the network exposure function network element.

In an exemplary embodiment, the target data packet distinguishing information may include at least one of target service flow template information, target data network name (DNN) information, target single network slice selection assistance information (S-NSSAI), and the like.

In a case that the authentication result indicates that the authentication succeeds and the first request message further includes the target group identifier, the first response message may include indication information indicating that the first request message is approved; or in a case that the authentication result indicates that the authentication succeeds and the first request message does not include the target group identifier, the first response message may include the target group identifier and indication information indicating that the first request message is approved.

The target group identifier may be used for indicating a target service server and/or a target terminal to configure, based on the target group identifier, a target group identifier of a target data packet belonging to a target group of the target service flow.

In an exemplary embodiment, in a case that the target data packet distinguishing information includes the target service flow template information, the target service flow template information may include at least one of a source network address, a source port number, a destination network address, a destination port number, a fully qualified domain name, an application identifier, and the like of the target service flow.

In an exemplary embodiment, the transmitting the target data packet distinguishing information and the target data packet loss threshold to a network exposure function network element may include: transmitting application function identification information and the target data packet distinguishing information to the network exposure function network element, the application function identification information and the target data packet distinguishing information being used for indicating the network exposure function network element to store the application function identification information and the target data packet distinguishing information in association; transmitting a second request message to the network exposure function network element, the second request message including the application function identification information and the target-group data packet loss threshold, and the second request message being used for indicating the network exposure function network element to authenticate the second request message, obtain, through searching, the target data packet distinguishing information based on the AF identification information in the second request message after the authentication on the second request message succeeds, and generate a second response message; and receiving the second response message returned by the network exposure function network element.

In an exemplary embodiment, the target data packet distinguishing information may include at least one of target service flow template information, target data network name (DNN) information, and target single network slice selection assistance information (S-NSSAI). In a case that the authentication result indicates that the authentication succeeds and the second request message further includes the target group identifier, the second response message may include indication information indicating that the second request message is approved; or in a case that the second request message does not include the target group identifier, the second response message may further include the target group identifier.

The target group identifier may be used for indicating a target service server and/or a target terminal to configure, based on the target group identifier, a target group identifier of a target data packet belonging to a target group of the target service flow.

For other content of this embodiment of the present disclosure, reference may be made to the foregoing other embodiments.

An embodiment of the present disclosure provides a data packet transmission method. The method may be performed by a target service server, and the method may include: obtaining a target group identifier; configuring a target group identifier for a target downlink data packet in a target group of a target service flow based on the target group identifier; and transmitting the target downlink data packet including the target group identifier to a user plane function (UPF) network element and/or a network device.

The target downlink data packet may be used for indicating the UPF network element and/or the network device to detect the target downlink data packet based on target data packet distinguishing information and a target group identifier that are included in a target data detection rule, and determine that the target group is a target to-be-discarded group based on a target-group data packet loss threshold included in a target processing rule and data packet loss information in the target group.

For other content of this embodiment of the present disclosure, reference may be made to the foregoing other embodiments.

An embodiment of the present disclosure provides a data packet transmission method. The method may be performed by a target terminal, and the method may include: obtaining a target group identifier; configuring a target group identifier for a target uplink data packet in a target group of a target service flow based on the target group identifier; and transmitting the target uplink data packet including the target group identifier to a network device and/or a UPF network element.

The target uplink data packet may be used for indicating the UPF network element and/or the network device to detect the target uplink data packet based on target data packet distinguishing information and a target group identifier that are included in a target data detection rule, and determine that the target group is a target to-be-discarded group based on a target-group data packet loss threshold included in a target processing rule and data packet loss information in the target group.

In an exemplary embodiment, the obtaining a target group identifier may include: obtaining the target group identifier from an application function (AF) network element.

In an exemplary embodiment, the obtaining a target group identifier may include: receiving a target downlink data packet transmitted by a target service server, the target downlink data packet carrying a target group identifier; and determining the target group identifier based on the target group identifier carried in the target downlink data packet.

In this embodiment of the present disclosure, for an uplink service flow, UE may be notified of the target group identifier in different manners. For example, in a manner, the AF network element or a target service server transmits application layer information to the UE, defines an application layer container, and carries the target group identifier. In another manner, the UE receives a target downlink data packet transmitted by the target service server, and learns, based on a target group identifier of the received downlink data packet, how to add a target group identifier to a target uplink data packet.

Figure 13:
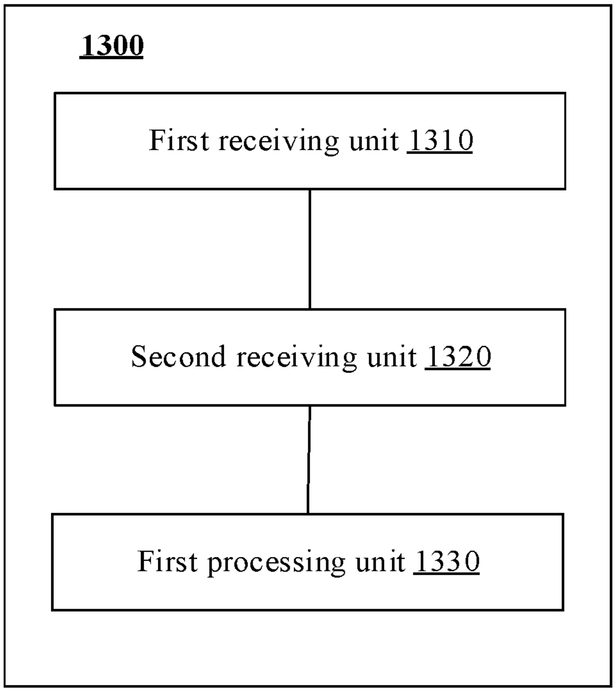
FIG. 13 is a block diagram of a user plane function network element according to an embodiment of the present disclosure.

An embodiment of the present disclosure provides a communication equipment that may be implemented by a user plane function network element and/or a network device (for example, a base station). The user plane function network element is used as an example. FIG. 13 is a block diagram of a user plane function network element according to an embodiment of the present disclosure. The UPF network element 1300 may include a first receiving unit 1310, a second receiving unit 1320, and a first processing unit 1330.

The first receiving unit 1310 may be configured to obtain a target data detection rule and a target processing rule for a target service flow.

The second receiving unit 1320 may be configured to receive a to-be-forwarded data packet.

The first processing unit 1330 may be configured to determine, from the to-be-forwarded data packet, a target data packet belonging to a target group of the target service flow based on target data packet distinguishing information and a target group identifier that are included in the target data detection rule.

The first processing unit 1330 may be further configured to determine data packet loss information in the target group.

The first processing unit 1330 may be further configured to determine that the target group is a target to-be-discarded group based on a target-group data packet loss threshold included in the target processing rule and the data packet loss information in the target group.

In an exemplary embodiment, the first receiving unit 1310 may be further configured to: obtain, through a user plane function network element and/or a network device, the target data detection rule and the target processing rule from a session management function network element.

In an exemplary embodiment, the target data detection rule may further include an uplink/downlink effective indication. The first processing unit 1330 may be further configured to: determine, based on the uplink/downlink effective indication through user plane function network element and/or the network device, whether the target data detection rule is effective for an uplink service flow, a downlink service flow, or an uplink/downlink service flow of the target service flow; and in the case of determining that the target data detection rule is effective for a downlink service flow and determining that the target data packet belongs to a downlink service flow of the target service flow, determine whether the target group is a target to-be-discarded group based on the target-group data packet loss threshold and the data packet loss information; in the case of determining that the target data detection rule is effective for an uplink service flow and determining that the target data packet belongs to an uplink service flow of the target service flow, determine whether the target group is a target to-be-discarded group based on the target-group data packet loss threshold and the data packet loss information; or in the case of determining that the target data detection rule is effective for an uplink/downlink service flow, separately detect an uplink service flow and a downlink service flow of the target service flow, and determine whether a target group to which the uplink service flow or the downlink service flow belongs is a target to-be-discarded group based on the target-group data packet loss threshold and the data packet loss information.

In an exemplary embodiment, the first processing unit 1330 may be further configured to discard a remaining target data packet in the target to-be-discarded group.

For other content of the embodiment of FIG. 13, reference may be made to the foregoing other embodiments.

Figure 14:
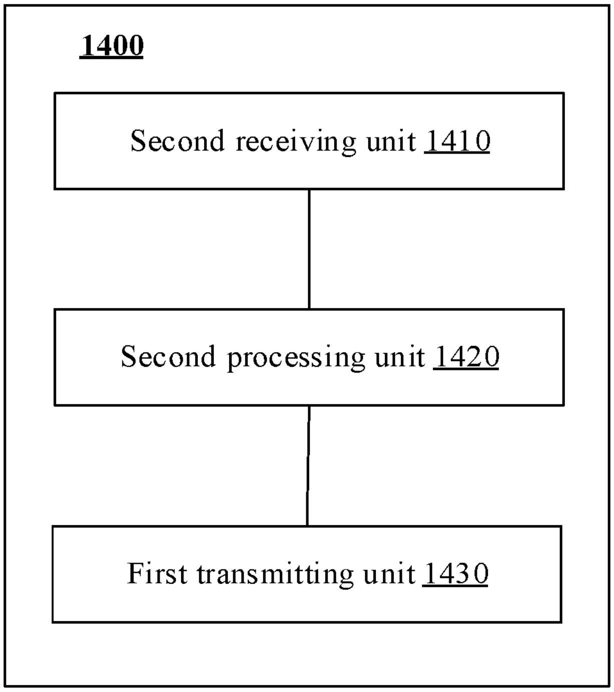
FIG. 14 is a block diagram of a policy control function network element according to an embodiment of the present disclosure.

FIG. 14 is a block diagram of an SMF network element according to an embodiment of the present disclosure.

As shown in FIG. 14, this embodiment of the present disclosure provides an SMF network element 1400. The SMF network element 1400 may include a second receiving unit 1410, a second processing unit 1420, and a first transmitting unit 1430.

The second receiving unit 1410 may be configured to obtain a group data packet processing policy rule from a policy control function network element, the group data packet processing policy rule including a target group identifier of a target service flow, a target-group data packet loss threshold, and target data packet distinguishing information.

The second processing unit 1420 may be configured to generate a target data detection rule for the target service flow based on the target group identifier and the target data packet distinguishing information.

The second processing unit 1420 may be further configured to generate a target processing rule for the target service flow based on the target-group data packet loss threshold.

The first transmitting unit 1430 may be configured to transmit the target data detection rule and the target processing rule to a network device and/or a UPF network element.

The target data detection rule may be used for indicating the network device and/or the UPF network element to determine, from a received to-be-forwarded data packet, a target data packet belonging to a target group of the target service flow based on the target group identifier and the target data packet distinguishing information that are included in the target data detection rule.

The target processing rule may be used for indicating the network device and/or the UPF network element to determine that the target group is a target to-be-discarded group based on data packet loss information in the target group and the target-group data packet loss threshold included in the target processing rule.

In an exemplary embodiment, the first transmitting unit 1430 may be further configured to: transmit quality of service profile information to an AMF network element, the quality of service profile including the target data detection rule and the target processing rule. The quality of service profile may be used for indicating the AMF network element to transmit the quality of service profile to the network device.

For other content of the embodiment of FIG. 14, reference may be made to the foregoing other embodiments.

An embodiment of the present disclosure provides a PCF network element. The PCF network element may include: a third receiving unit, configured to obtain group data packet processing request information of a target service flow, the group data packet processing request information including a target group identifier, a target-group data packet loss threshold, and target data packet distinguishing information; a third processing unit, configured to generate a group data packet processing policy rule based on the group data packet processing request information; and a second transmitting unit, configured to transmit, to a session management function network element, the group data packet processing policy rule including the target group identifier, the target-group data packet loss threshold, and the target data packet distinguishing information.

The target group identifier and the target data packet distinguishing information may be used for indicating the session management function network element to generate a target data detection rule for the target service flow based on the target data packet distinguishing information and the target group identifier.

The target-group data packet loss threshold may be used for indicating the session management function network element to generate a target processing rule for the target service flow based on the target-group data packet loss threshold.

For other content of this embodiment of the present disclosure, reference may be made to the foregoing other embodiments.

An embodiment of the present disclosure provides an application function network element. The application function network element may include: a third transmitting unit, configured to transmit group data packet processing request information to a policy control function network element.

The group data packet processing request information may include a target group identifier, a target-group data packet loss threshold, and target data packet distinguishing information.

The target group identifier, the target-group data packet loss threshold, and the target data packet distinguishing information may be used for indicating the policy control function network element to generate a group data packet processing policy rule and transmit, to a session management function network element, the group data packet processing policy rule including the target group identifier, the target-group data packet loss threshold, and the target data packet distinguishing information.

In an exemplary embodiment, the third transmitting unit may be further configured to: transmit the target data packet distinguishing information and the target data packet loss threshold to a network exposure function network element.

The target data packet distinguishing information and the target-group data packet loss threshold may be used for indicating the network exposure function network element to transmit the target group identifier, the target data packet distinguishing information, and the target-group data packet loss threshold to the policy control function network element.

In an exemplary embodiment, the third transmitting unit may be further configured to: transmit a first request message to the network exposure function network element. The first request message may include application function identification information, the target-group data packet loss threshold, and the target data packet distinguishing information. The first request message may be used for indicating the network exposure function network element to authenticate the first request message and generate a first response message based on an authentication result. The application function network element may further include a fourth receiving unit, configured to receive the first response message returned by the network exposure function network element.

In an exemplary embodiment, the target data packet distinguishing information may include at least one of target service flow template information, target data network name (DNN) information, target single network slice selection assistance information (S-NSSAI), and the like.

Based on an authentication result, in a case that the authentication result indicates that the authentication succeeds and the first request message further includes the target group identifier, the first response message may include indication information indicating that the first request message is approved; or in a case that the first request message does not include the target group identifier, the first response message may further include the target group identifier. The target group identifier may be used for indicating a target service server and/or a target terminal to configure, based on the target group identifier, a target group identifier of a target data packet belonging to a target group of the target service flow.

In an exemplary embodiment, in a case that the target data packet distinguishing information includes the target service flow template information, the target service flow template information may include at least one of a source network address, a source port number, a destination network address, a destination port number, a fully qualified domain name, an application identifier, and the like of the target service flow.

In an exemplary embodiment, the third transmitting unit may be further configured to: transmit application function identification information and the target data packet distinguishing information to the network exposure function network element. The application function identification information and the target data packet distinguishing information may be used for indicating the network exposure function network element to store the application function identification information and the target data packet distinguishing information in association.

The third transmitting unit may be further configured to: transmit a second request message to the network exposure function network element. The second request message includes the AF identification information and the target-group data packet loss threshold. The second request message may be used for indicating the network exposure function network element to authenticate the second request message, obtain, through searching, the target data packet distinguishing information based on the AF identification information in the second request message after the authentication on the second request message succeeds, and generate a second response message.

The fourth receiving unit may be further configured to: receive the second response message returned by the network exposure function network element.

In an exemplary embodiment, the target data packet distinguishing information includes at least one of target service flow template information, target data network name (DNN) information, and target single network slice selection assistance information (S-NSSAI). In a case that the authentication result indicates that the authentication succeeds and the second request message further includes the target group identifier, the second response message may include indication information indicating that the second request message is approved; or in a case that the second request message does not include the target group identifier, the second response message may further include the target group identifier. The target group identifier may be used for indicating a target service server and/or a target terminal to configure, based on the target group identifier, a target group identifier of a target data packet belonging to a target group of the target service flow.

For other content of this embodiment of the present disclosure, reference may be made to the foregoing other embodiments.

An embodiment of the present disclosure provides a target service server. The target service server may include: a first obtaining unit, configured to obtain a target group identifier; a fourth processing unit, configured to configure a target group identifier for a target downlink data packet in a target group of a target service flow based on the target group identifier; and a fourth transmitting unit, configured to transmit the target downlink data packet including the target group identifier to a UPF network element and/or a network device.

The target downlink data packet may be used for indicating the UPF network element and/or the network device to detect the target downlink data packet based on a target group identifier and target data packet distinguishing information that are included in a target data detection rule, and determine that the target group is a target to-be-discarded group based on a target-group data packet loss threshold included in a target processing rule and data packet loss information in the target group.

For other content of this embodiment of the present disclosure, reference may be made to the foregoing other embodiments.

An embodiment of the present disclosure provides a target terminal. The target terminal may include: a second obtaining unit, configured to obtain a target group identifier; a fifth processing unit, configured to configure a target group identifier for a target uplink data packet in a target group of a target service flow based on the target group identifier; and a fifth transmitting unit, configured to transmit the target uplink data packet including the target group identifier to a UPF network element and/or a network device.

The target uplink data packet may be used for indicating the UPF network element and/or the network device to detect the target uplink data packet based on target data packet distinguishing information and a target group identifier that are included in a target data detection rule, and determine that the target group is a target to-be-discarded group based on a target-group data packet loss threshold included in a target processing rule and data packet loss information in the target group.

In an exemplary embodiment, the obtaining unit may be further configured to: obtain the target group identifier from an application function (AF) network element.

In an exemplary embodiment, the obtaining unit may be further configured to: receive a target downlink data packet transmitted by a target service server, the target downlink data packet carrying a target group identifier; and determine the target group identifier based on the target group identifier.

For other content of this embodiment of the present disclosure, reference may be made to the foregoing other embodiments.

Figure 15:
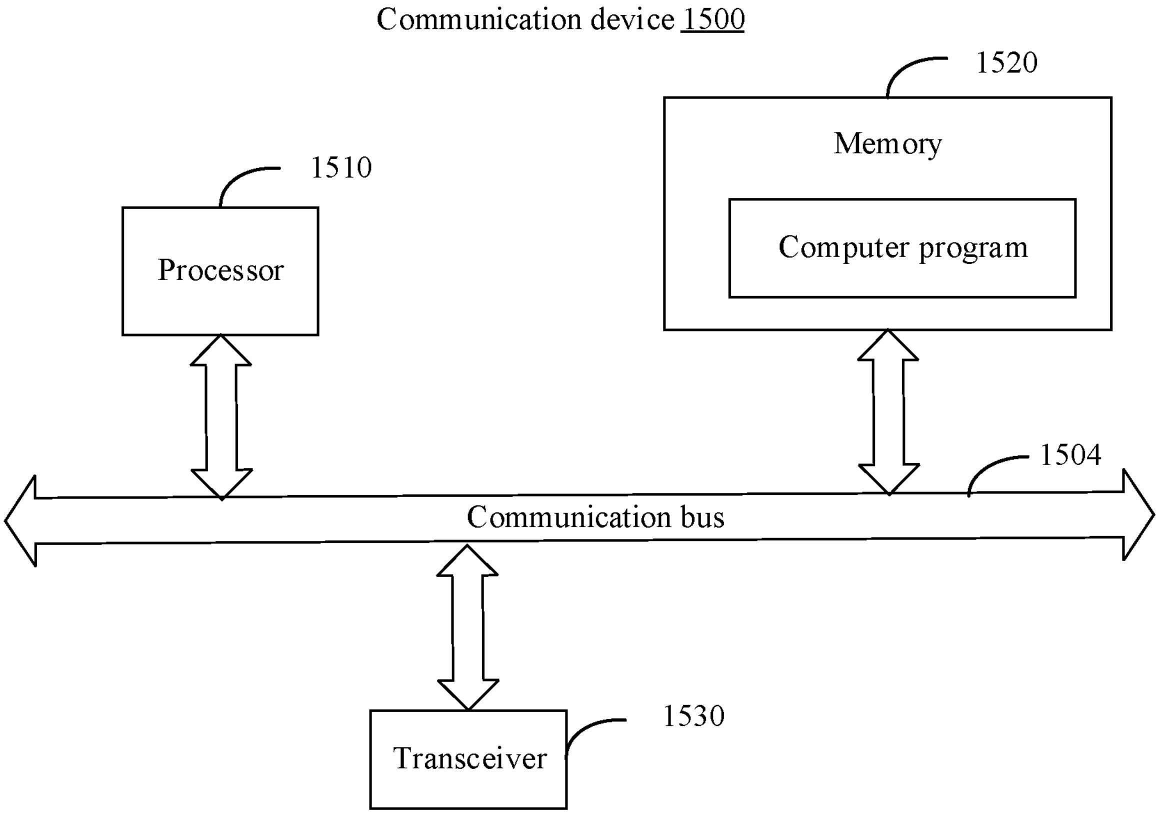
FIG. 15 is a schematic structural diagram of a communication equipment according to an embodiment of the present disclosure.

FIG. 15 is a schematic structural diagram of a communication equipment 1500 according to an embodiment of the present disclosure. The communication equipment may be a terminal such as UE, a network device such as a base station, or a PCF network element and/or an NEF network element and/or an AF network element and/or an AMF network element and/or an SMF network element and/or a UPF network element. The communication equipment 1500 shown in FIG. 15 includes a processor 1510. The processor 1510 may invoke a computer program from a memory and run the computer program to implement the methods in the embodiments of the present disclosure.

In some embodiments, as shown in FIG. 15, the communication devi equipment ce 1500 may further include a memory 1520. The processor 1510 may invoke a computer program from the memory 1520 and run the computer program to implement the methods in the embodiments of the present disclosure.

The memory 1520 may be a separate device independent of the processor 1510, or may be integrated in the processor 1510.

In some embodiments, as shown in FIG. 15, the communication equipment 1500 may further include a transceiver 1530. The processor 1510 may control the transceiver 1530 to communicate with another device to transmit information or data to another device, or receive information or data transmitted by another device.

The transceiver 1530 may include a transmitter and a receiver. The transceiver 1530 may further include an antenna. There may be one or more antennas.

In some embodiments, the communication equipment 1500 may be any network element in the embodiments of the present disclosure, and the communication equipment 1500 may implement corresponding processes implemented by any network element in the methods in the embodiments of the present disclosure. For brevity, details are not described herein again.

In some embodiments, the communication equipment 1500 may be the network device in the embodiments of the present disclosure, and the communication equipment 1500 may implement corresponding processes implemented by the network device in the methods in the embodiments of the present disclosure. For brevity, details are not described herein again.

In some embodiments, the communication equipment 1500 may be the mobile terminal or the terminal in the embodiments of the present disclosure, and the communication equipment 1500 may implement corresponding processes implemented by the mobile terminal or the terminal in the methods in the embodiments of the present disclosure. For brevity, details are not described herein again.

It is to be understood that the processor in the embodiments of the present disclosure may be an integrated circuit chip with a signal processing capability. During implementation, the steps in the foregoing method embodiments may be performed by an integrated logic circuit of hardware in a processor or through instructions in a form of software.

The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logical block diagrams disclosed in the embodiments of the present disclosure. The general-purpose processor may be a microprocessor, or the processor may be any conventional processor or the like. The steps of the methods disclosed with reference to the embodiments of the present disclosure may be directly implemented by a hardware decoding processor, or may be implemented by a combination of hardware and software modules in a decoding processor. The software module may be located in a storage medium mature in the art, such as a random access memory, a flash memory, a read-only memory, a programmable read-only memory or electrically erasable programmable memory, or a register. The storage medium is located in the memory. The processor reads information in the memory and completes the steps of the methods in combination with hardware thereof.

It can be understood that the memory in the embodiments of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and serves as an external cache. By way of example but not limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory in the system and the method described in this specification includes but is not limited to these memories and any memory of another proper type. The foregoing memories are exemplary but not limitative description.

An embodiment of the present disclosure further provides a computer-readable storage medium, configured to store a computer program.

In some embodiments, the computer-readable storage medium may be applied to the network device in the embodiments of the present disclosure, and the computer program enables a computer to perform corresponding processes implemented by the network device in the methods in the embodiments of the present disclosure. For brevity, details are not described herein again.

In some embodiments, the computer-readable storage medium may be applied to any network element in the embodiments of the present disclosure, and the computer program enables a computer to perform corresponding processes implemented by any network element in the methods in the embodiments of the present disclosure. For brevity, details are not described herein again.

In some embodiments, the computer-readable storage medium may be applied to the mobile terminal or the terminal in the embodiments of the present disclosure, and the computer program enables a computer to perform corresponding processes implemented by the mobile terminal or the terminal in the methods in the embodiments of the present disclosure. For brevity, details are not described herein again.

An embodiment of the present disclosure further provides a computer program product, including computer program instructions.

In some embodiments, the computer program product may be applied to the network device in the embodiments of the present disclosure, and the computer program instructions enable a computer to perform corresponding processes implemented by the network device in the methods in the embodiments of the present disclosure. For brevity, details are not described herein again.

In some embodiments, the computer program product may be applied to any network element in the embodiments of the present disclosure, and the computer program instructions enable a computer to perform corresponding processes implemented by any network element in the methods in the embodiments of the present disclosure. For brevity, details are not described herein again.

In some embodiments, the computer program product may be applied to the mobile terminal or the terminal in the embodiments of the present disclosure, and the computer instructions enable a computer to perform corresponding processes implemented by the mobile terminal or the terminal in the methods in the embodiments of the present disclosure. For brevity, details are not described herein again.

An embodiment of the present disclosure further provides a computer program.

In some embodiments, the computer program may be applied to the network device in the embodiments of the present disclosure, and when the computer program runs on a computer, the computer is enabled to perform corresponding processes implemented by the network device in the methods in the embodiments of the present disclosure. For brevity, details are not described herein again.

In some embodiments, the computer program may be applied to any network element in the embodiments of the present disclosure, and when the computer program runs on a computer, the computer is enabled to perform corresponding processes implemented by any network element in the methods in the embodiments of the present disclosure. For brevity, details are not described herein again.

In some embodiments, the computer program may be applied to the mobile terminal or the terminal in the embodiments of the present disclosure, and when the computer program runs on a computer, the computer is enabled to perform corresponding processes implemented by the mobile terminal or the terminal in the methods in the embodiments of the present disclosure. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraints of technical solutions. A person skilled in the art may use different methods to implement the described functions for each particular application, but it is not to be considered that the implementation goes beyond the scope of the present disclosure.

A person skilled in the art may clearly understand that, for simple and clear description, for exemplary work processes of the foregoing described system, apparatus, and unit, reference may be made to corresponding process in the foregoing method embodiments, and details are not described herein again.

In the several embodiments provided in the present disclosure, the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed.

The units described as separate parts may or may not be physically separate, and parts shown as units may or may not be physical units, that is, may be located in one place, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

If implemented in the form of software functional units and sold or used as an independent product, the functions may be stored in a computer-readable storage medium, such as a non-transitory computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, for example, a USB flash drive, a removable hard disk, a read-only memory (ROM), a random access memory (RAM), a magnetic disk, or an optical disc.

In an example, the program instructions may be deployed on one computer device for execution, or deployed on at least two computer devices at one location, or executed on at least two computer devices distributed in at least two locations and interconnected through a communication network. The at least two computer devices distributed in the at least two locations and interconnected through the communication network may form a blockchain network.

The computer-readable storage medium may be any internal storage unit of the network connection apparatus or the computer device described in any one of the foregoing embodiments, for example, a hard disk or a main memory of the computer device. In an example, the computer-readable storage medium may be an external storage device of the computer device, for example, a removable hard disk, a smart memory card (SMC), a secure digital (SD) card, or a flash card equipped on the computer device. In an example, the computer-readable storage medium may include both an internal storage unit and an external storage device of the computer device. The computer-readable storage medium may be configured to store the computer program and another program and data that are required by the computer device. The computer-readable storage medium may be further configured to temporarily store data that has been outputted or data to be outputted.

In the specification, claims, and accompanying drawings of the embodiments of this disclosure, the terms “first”, “second”, or the like are intended to distinguish between different objects but do not indicate a particular order. In addition, the term “include” and any variant thereof are intended to cover a non-exclusive inclusion. For example, a process, method, apparatus, product, or device that includes a series of steps or units is not limited to the listed steps or modules; and instead, may further include a step or module that is not listed, or may further include another step or unit that is intrinsic to the process, method, apparatus, product, or device.

A person of ordinary skill in the art may be aware that, in combination with examples of units and algorithm steps described in the embodiments disclosed in this specification, this disclosure may be implemented by using electronic hardware, computer software, or a combination thereof. To describe interchangeability between the hardware and the software, compositions and steps of each example have been generally described according to functions in the foregoing descriptions. Whether these functions are performed by hardware or software depends on particular applications and design constraints of the technical solutions. A person skilled in the art may use different methods to implement the described functions for each particular application, but it is not to be considered that the implementation goes beyond the scope of this disclosure.

The methods and related apparatuses provided in the embodiments of this disclosure are described with reference to the method flowcharts and/or structural schematic diagrams provided in the embodiments of this disclosure. For example, each process and/or block in the method flowcharts and/or structural schematic diagrams, and combinations of processes and/or blocks in flowcharts and/or block diagrams may be implemented by the computer program instructions. These computer program instructions may be provided to a general-purpose computer, a special-purpose computer, an embedded processor, or a processor of another programmable network connection device to generate a machine, so that an apparatus configured to implement functions specified in one or more procedures in the flowcharts and/or one or more blocks in the structural schematic diagrams is generated by using instructions executed by the general-purpose computer or the processor of another programmable network connection device. These computer program instructions may also be stored in a computer-readable memory that can guide a computer or another programmable network connection device to work in a specific manner, so that the instructions stored in the computer-readable memory generate a product including an instruction apparatus, where the instruction apparatus implements functions specified in one or more procedures in the flowcharts and/or one or more blocks in the structural schematic diagrams. These computer program instructions may also be loaded into a computer or another programmable network connection device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the structural schematic diagrams.

The use of “at least one of” or “one of” in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The foregoing descriptions are merely exemplary implementations of the present disclosure, and are not intended to limit the scope of the present disclosure. Other variations or replacements shall fall within the scope of the present disclosure.

What is claimed is:

1. A data packet transmission method, comprising:

obtaining a target data detection rule and a target processing rule for a target service flow, the target data detection rule indicating a target group identifier of a target group of the target service flow, the target group including a plurality of target data packets, the target processing rule indicating a target-group data packet loss threshold;

determining data packet loss information of the target group, the data packet loss information of the target group indicating a number of lost target data packets in the plurality of target data packets in the target group; and determining that the target group is a target to-be-discarded group when the number of lost target data packets in the plurality of target data packets in the target group indicated by the data packet loss information of the target group is larger than an acceptable number of lost data packets in the plurality of target data packets in the target group indicated by the target-group data packet loss threshold, wherein the acceptable number of lost data packets in the plurality of target data packets in the target group is a first number of lost data packets in the plurality of target data packets in the target group when the target group is transmitted from a target service server to a user plane function (UPF) network element, and the acceptable number of lost data packets in the plurality of target data packets in the target group is a second number of lost data packets in the plurality of target data packets in the target group when the target group is transmitted from the UPF network element to a network device, the second number of lost data packets being different from the first number of lost data packets.

2. The method according to claim 1, wherein the obtaining comprises:

receiving, by at least one of the UPF network element or the network device, the target data detection rule and the target processing rule from a session management function network element.

3. The method according to claim 1, wherein the target data detection rule includes an uplink/downlink effective indication indicating whether the target data detection rule is effective for one of (i) an uplink service flow, (ii) a downlink service flow, and (iii) the uplink service flow and the downlink service flow; and the uplink/downlink effective indication indicates that the target data detection rule is effective for the downlink service flow and that a target data packet belongs to the downlink service flow of the target service flow.

4. The method according to claim 1, wherein the target data detection rule includes an uplink/downlink effective indication indicating whether the target data detection rule is effective for one of (i) an uplink service flow, (ii) a downlink service flow, and (iii) the uplink service flow and the downlink service flow; and the uplink/downlink effective indication indicates that the target data detection rule is effective for the uplink service flow and that a target data packet belongs to the uplink service flow of the target service flow.

5. The method according to claim 1, wherein the target data detection rule includes an uplink/downlink effective indication indicating whether the target data detection rule is effective for one of (i) an uplink service flow, (ii) a downlink service flow, and (iii) the uplink service flow and the downlink service flow;

the uplink/downlink effective indication indicates that the target data detection rule is effective for the uplink service flow and the downlink service flow, and the determining that the target group is the target to-be-discarded group comprises:

separately detecting the uplink service flow and the downlink service flow of the target service flow, and determining whether the target group to which the uplink service flow or the downlink service flow belongs is the target to-be-discarded group based on whether the number of lost target data packets in the plurality of target data packets in the target group is larger than the acceptable number of lost data packets in the plurality of target data packets in the target group.

6. The method according to claim 1, further comprising:

discarding a remaining target data packet that is to be transmitted in the target to-be-discarded group, the remaining target data packet being in the plurality of target data packets.

7. The method according to claim 1, wherein the data packet loss information of the target group indicates a packet loss ratio of the number of lost target data packets in the plurality of target data packets in the target group to a number of the plurality of target data packets in the target group.

8. An apparatus, comprising:

processing circuitry configured to:

obtain a target data detection rule and a target processing rule for a target service flow, the target data detection rule indicating a target group identifier of a target group of the target service flow, the target group including a plurality of target data packets, the target processing rule indicating a target-group data packet loss threshold;

determine data packet loss information of the target group, the data packet loss information of the target group indicating a number of lost target data packets in the plurality of target data packets in the target group; and determine that the target group is a target to-be-discarded group when the number of lost target data packets in the plurality of target data packets in the target group indicated by the data packet loss information of the target group is larger than an acceptable number of lost data packets in the plurality of target data packets in the target group indicated by the target-group data packet loss threshold, wherein the acceptable number of lost data packets in the plurality of target data packets in the target group is a first number of lost data packets in the plurality of target data packets in the target group when the target group is transmitted from a target service server to a user plane function (UPF) network element, and the acceptable number of lost data packets in the plurality of target data packets in the target group is a second number of lost data packets in the plurality of target data packets in the target group when the target group is transmitted from the UPF network element to a network device, the second number of lost data packets being different from the first number of lost data packets.

* * * * *